(12) United States Patent
Oishi

(10) Patent No.: US 8,956,474 B2
(45) Date of Patent: Feb. 17, 2015

(54) PRESSURE RESISTANT AND CORROSION RESISTANT COPPER ALLOY, BRAZED STRUCTURE, AND METHOD OF MANUFACTURING BRAZED STRUCTURE

(71) Applicant: Mitsubishi Shindoh Co., Ltd., Tokyo (JP)

(72) Inventor: Keiichiro Oishi, Osaka (JP)

(73) Assignee: Mitsubishi Shindoh Co., Ltd., Tokyo (JP)

( * ) Notice: Subject to any disclaimer, the term of this patent is extended or adjusted under 35 U.S.C. 154(b) by 0 days.

(21) Appl. No.: 13/867,872

(22) Filed: Apr. 22, 2013

(65) Prior Publication Data

US 2013/0319581 A1 Dec. 5, 2013

Related U.S. Application Data

(63) Continuation-in-part of application No. PCT/JP2011/074389, filed on Oct. 24, 2011.

(30) Foreign Application Priority Data

Oct. 25, 2010 (JP) ................ P2010-238311

(51) Int. Cl.
*B23K 31/02* (2006.01)
*B23K 1/00* (2006.01)
(Continued)

(52) U.S. Cl.
CPC ............ *B23K 31/02* (2013.01); *B23K 1/0012* (2013.01); *B23K 1/008* (2013.01); *B23K 1/19* (2013.01); *B23K 1/203* (2013.01); *C22C 9/04* (2013.01);
(Continued)

(58) Field of Classification Search
CPC ....................................................... B23K 31/02
USPC ................................................. 148/528, 536
See application file for complete search history.

(56) References Cited

U.S. PATENT DOCUMENTS 4,055,445 A 10/1977 Pops
6,413,330 B1 7/2002 Oishi
(Continued)

FOREIGN PATENT DOCUMENTS

EP 1 930 453 A1 6/2008
JP 10-202391 A 8/1998
(Continued)

OTHER PUBLICATIONS

Office Action issued in co-pending related U.S. Appl. No. 13/867,782 on Feb. 20, 2014.
(Continued)

*Primary Examiner* — Brian Walck
(74) *Attorney, Agent, or Firm* — Griffin & Szipl, P.C.

(57) ABSTRACT

A pressure resistant and corrosion resistant copper alloy contains 73.0 mass % to 79.5 mass % of Cu and 2.5 mass % to 4.0 mass % of Si with a remainder composed of Zn and inevitable impurities, in which the content of Cu [Cu] mass % and the content of Si [Si] mass % have a relationship of 62.0≤[Cu]−3.6×[Si]≤67.5. In addition, the area fraction of the α phase "α"%, the area fraction of a β phase "β"%, the area fraction of a γ phase "γ"%, the area fraction of the κ phase "κ"%, and the area fraction of a μ phase "μ"% satisfy 30≤"α"≤84, 15≤"κ"≤68, "α"+"κ"≥92, 0.2≤"κ"/"α"≤2, "β"≤3, "μ"≤5, "β"+"μ"≤6, 0≤"γ"≤7, and 0≤"β"+"μ"+"γ"≤8. Also disclosed is a method of manufacturing a brazed structure made of the above pressure resistant and corrosion resistant copper alloy.

8 Claims, 1 Drawing Sheet

A11L2(55.7α −41.3κ −2.3γ −0.7β)

(51) Int. Cl.
*B23K 1/008* (2006.01)
*B23K 1/19* (2006.01)
*B23K 1/20* (2006.01)
*C22C 9/04* (2006.01)
*B23K 35/30* (2006.01)

(52) U.S. Cl.
CPC ........... *B23K 35/302* (2013.01); *B23K 2201/12* (2013.01); *B23K 2203/12* (2013.01); *B23K 2203/18* (2013.01)
USPC ........................................ 148/528; 148/536

(56) References Cited

U.S. PATENT DOCUMENTS

| | | | |
|---|---|---|---|
| 7,056,396 | B2 | 6/2006 | Oishi |
| 7,883,589 | B2 | 2/2011 | Oishi |
| 2005/0006443 | A1 | 1/2005 | Hattori et al. |
| 2005/0082350 | A1 | 4/2005 | Tarui et al. |
| 2005/0092401 | A1 | 5/2005 | Oishi |
| 2007/0062615 | A1 | 3/2007 | Oishi |
| 2007/0169854 | A1 | 7/2007 | Oishi |

FOREIGN PATENT DOCUMENTS

| | | |
|---|---|---|
| JP | 2005-028412 A | 2/2005 |
| JP | 2005-118826 A | 5/2005 |
| JP | 2008-214760 A | 9/2008 |
| JP | 2009-509031 A | 3/2009 |

OTHER PUBLICATIONS

Search Report issued in International application No. PCT/JP2011/074389, completed on Jan. 11, 2012 and mailed on Jan. 24, 2012.

Office Action issued in co-pending related Canadian application 2,813,495, mailed Mar. 25, 2014.

A11L2(55.7α−41.3κ−2.3γ−0.7β)

A21L7(59.4α−38.8κ−0.4γ−1.4μ)

A26L4(63.1α−34.9κ−2γ)

A11L6(62.6α−34.6κ−2.8γ)

PRESSURE RESISTANT AND CORROSION RESISTANT COPPER ALLOY, BRAZED STRUCTURE, AND METHOD OF MANUFACTURING BRAZED STRUCTURE

This is a Continuation-in-Part application in the United States of International Patent Application No. PCT/JP2011/074389 filed Oct. 24, 2011, which claims priority on Japanese Patent Application No. 2010-238311, filed Oct. 25, 2010. The entire disclosures of the above patent applications are hereby incorporated by reference.

TECHNICAL FIELD OF THE INVENTION

The present invention relates to a pressure resistant and corrosion resistant copper alloy brazed to another material, a brazed structure having a pressure resistant and corrosion resistant copper alloy, and a method of manufacturing a brazed structure, and particularly to a pressure resistant and corrosion resistant copper alloy having high pressure resistance and excellent corrosion resistance, and the like.

BACKGROUND OF THE INVENTION

Background Art

Examples of containers, devices, and members for high-pressure gas facilities, air-conditioning facilities, cold and hot-water supply equipment, and the like include a variety of valves including a high-pressure valve, a variety of joints, hydraulic containers such as a variety of valves, joints and cylinders, nozzles, sprinklers, water faucet clasps, and the like, and a copper alloy used for the above is joined with a copper pipe, a variety of members, and the like. Since a high pressure is applied to the joint portion, brazing is employed as a joining method from the viewpoint of reliability. Brazing produces a high joint strength and a high reliability, but the melting point of a brazing is high, approximately 700° C. to 830° C., and therefore a copper alloy to be brazed is also, accordingly, heated to a temperature of the melting point of the brazing or higher. However, since a copper alloy used for the above members generally has a melting point of approximately 850° C. to 950° C., there is a problem in that the material strength of a brazed copper alloy significantly decreases, and corrosion resistance degrades.

The above copper alloy is a cut hot-forged material, a cut extruded rod material, or a cut material of a cast metal and a continuously cast rod. Examples of the hot-forged material or the extruded rod material include a forging brass rod C3771 that is mainly based on JIS H 3250 standards and is excellent in terms of hot forgeability (typical composition: 59Cu-2Pb-remainder: Zn), a free-cutting brass C3604 that is excellent in cutting work (typical composition: 59Cu-3Pb-remainder: Zn), a copper alloy material obtained by substituting Pb in the above materials with Bi due to a recent demand for removing Pb, and dezincification corrosion resistant forging brass or dezincification corrosion resistant free-cutting brass in which the concentration of copper is increased to 61 mass % to 63 mass % in order to obtain excellent dezincification resistance.

Meanwhile, examples of the cast metal include CAC406 (85Cu-5Sn-5Zn-5Pb) which is a cast metal based on the standards of JIS H 5120 or JIS H 5121 or a continuously forged cast and a Cu—Sn—Zn—Pb alloy that is excellent in terms of corrosion resistance, a Cu—Sn—Zn—Bi alloy obtained by substituting Pb in the above alloy with Bi, brass cast metal CAC202 (67Cu-1Pb-remainder: Zn) that is excellent in terms of mold castability, CAC203 (60Cu-1Pb-remainder: Zn), and the like. However, when the above copper alloy is brazed, since the copper alloy is heated to a high temperature of approximately 800° C. or approximately 750° C., or at least 700° C. or higher, there is a problem in that the material strength decreases. Particularly, in a Cu—Zn alloy containing Pb, Bi, Sn, and the like, when the Cu concentration exceeds 64 mass %, the crystal grains coarsen such that the strength significantly decreases. In addition, the CAC406 alloy has a high Cu concentration, has had a problem of a low strength, and, furthermore, has a problem in that the strength decreases further. Meanwhile, when an alloy having 63 mass % or less of Cu, particularly, a Cu—Zn—Pb or Cu—Zn—Bi alloy is heated to a temperature of 700° C. or higher, particularly 800° C. or higher, the fraction of a β phase increases, and a problem occurs with the corrosion resistance. Furthermore, in a case in which the Cu concentration is low, since the fraction of the β phase increases, ductility or impact characteristics decrease.

General examples of a brazing material used for joining of a copper alloy such as a valve and a copper pipe or the like include a phosphor bronze brazing filler of JIS Z 3264 and a silver solder of JIS Z 3261. Among the above, a phosphor bronze brazing filler of BCuP-2 (typical composition: 7% P-93% Cu) is most frequently used, and a phosphor bronze brazing filler of BCuP-3 (typical composition: 6.5% P-5% Ag-88.5% Cu) and a silver solder of Bag-6 (typical composition: 50% Ag-34% Cu-16% Zn) are also frequently used. The melting points (solidus temperature-liquidus temperature) of the brazing filler metals are 710° C. to 795° C., 645° C. to 815° C., and 690° C. to 775° C. respectively, and the brazing temperatures are reported to be 735° C. to 845° C., 720° C. to 815° C., and 775° C. to 870° C. respectively in JIS standards. Therefore, while also depending on the kind of the brazing filler metal and the shape, thickness, and size of the copper alloy, the copper alloy such as a valve is heated to at least 700° C. or higher, approximately 800° C. over several seconds to several minutes, and non-directly heated portions also reach a high-temperature state. When the copper alloy is heated to at least 700° C. or higher, approximately 800° C., the above problem regarding pressure resistance or corrosion resistance occurs. Further, as a brazing method, there is a method in which a brazing filler metal is placed in a joint portion, and made to pass through a furnace heated to approximately 800° C., thereby performing continuous brazing. In this case, the entire copper alloy such as a valve is heated to 800° C., and cooled.

In addition, although not relating to characteristics after brazing, as a technique that decreases the β phase which degrades corrosion resistance, a technique in which a Bi-added free-cutting copper alloy composed of 60.0 mass % to 62.5% Cu, 0.4 mass % to 2.0 mass % Bi and 0.01 mass % to 0.05 mass % P with a remainder of Zn is hot-extruded, then slowly cooled so that the surface temperature of the extruded material becomes 180° C. or lower, then a thermal treatment is carried out at, for example, 350° C. to 550° C. for 1 hour to 8 hours so as to decrease the β phase and form a metallic structure in which the vicinity of the β phase is surrounded by an α phase, thereby securing favorable corrosion resistance is known (for example, refer to Japanese Unexamined Patent Application Publication No. 2008-214760). When the copper alloy is worked at a high temperature, since the amount of the β phase increases, corrosion resistance is secured by adding a slow cooling process after hot working as described above, and, furthermore, a thermal treatment process after cooling. However, in brazing, such slow cooling or a thermal treatment after cooling definitely leads to an increase in costs, and there is a problem in that the thermal treatment is difficult practically.

[Patent Document 1] Japanese Unexamined Patent Application Publication No. 2008-214760.

SUMMARY OF THE INVENTION

The invention has been made in order to solve the above problems of the related art, and an object of the invention is to provide a pressure resistant and corrosion resistant copper alloy brazed to another material that has high pressure resistance and excellent corrosion resistance.

In order to solve the above problems, the present inventors studied the compositions and metallic structures of copper alloys. As a result, it was found that high pressure resistance and excellent corrosion resistance can be obtained by setting the area fractions of the respective phases in the metallic structure within a predetermined range in a copper alloy having a predetermined composition.

Specifically, it was found that high pressure resistance and excellent corrosion resistance can be obtained in a case in which a copper alloy has an alloy composition containing 73.0 mass % to 79.5 mass % of Cu and 2.5 mass % to 4.0 mass % of Si with a remainder composed of Zn and inevitable impurities, the content of Cu [Cu] mass % and the content of Si [Si] mass % have a relationship of $62.0 \leq [Cu]-3.6\times[Si] \leq 67.5$, and the metallic structure at the brazed portion of the copper alloy includes at least a κ phase in an α phase matrix, and the area fraction of the α phase "α"%, the area fraction of a β phase "β"%, the area fraction of a γ phase "γ"%, the area fraction of the κ phase "κ"%, and the area fraction of a μ phase "μ"% satisfy $30 \leq "α" \leq 84$, $15 \leq "κ" \leq 68$, $"α"+"κ" \geq 92$, $0.2 \leq "κ"/"α" \leq 2$, $0 \leq "β" \leq 3$, $0 \leq "μ" \leq 5$, $0 \leq "β"+"μ" \leq 6$, $0 \leq "γ" \leq 7$, and $0 \leq "β"+"μ"+"γ" \leq 8$. Further, the brazed portion refers to a portion heated to 700° C. or higher during brazing.

The invention has been completed based on the above finding of the inventors. That is, in order to solve the above problems, the invention provides a pressure resistant and corrosion resistant copper alloy brazed to another material having an alloy composition containing 73.0 mass % to 79.5 mass % of Cu and 2.5 mass % to 4.0 mass % of Si with a remainder composed of Zn and inevitable impurities, in which the content of Cu [Cu] mass % and the content of Si [Si] mass % have a relationship of $62.0 \leq [Cu]-3.6\times[Si] \leq 67.5$, the metallic structure at the brazed portion of the copper alloy includes at least a κ phase in an α phase matrix, and the area fraction of the α phase "α"%, the area fraction of a β phase "β"%, the area fraction of a γ phase "γ"%, the area fraction of the κ phase "κ"%, and the area fraction of a μ phase "μ"% satisfy $30 \leq "α" \leq 84$, $15 \leq "κ" \leq 68$, $"α"+"κ" \geq 92$, $0.2 \leq "κ"/"α" \leq 2$, $0 \leq "β" \leq 3$, $0 \leq "μ" \leq 5$, $0 \leq "β"+"μ" \leq 6$, $0 \leq "γ" \leq 7$, and $0 \leq "β"+"μ"+"γ" \leq 8$. The pressure resistant and corrosion resistant copper alloy brazed to another material can have high pressure resistance and excellent corrosion resistance.

Preferably, the copper alloy further contains at least one of 0.015 mass % to 0.2 mass % of P, 0.015 mass % to 0.2 mass % of Sb, 0.015 mass % to 0.15 mass % of As, 0.03 mass % to 1.0 mass % of Sn, and 0.03 mass % to 1.5 mass % of Al, and the content of Cu [Cu] mass %, the content of Si [Si] mass %, the content of P [P] mass %, the content of Sb [Sb] mass %, the content of As [As] mass %, the content of Sn [Sn] mass %, and the content of Al [Al] mass % satisfy $62.0 \leq [Cu]-3.6\times[Si]-3\times[P]-0.3\times[Sb]+0.5\times[As]-1\times[Sn]-1.9\times[Al] \leq 67.5$.

Since the copper alloy has at least one of P, Sb, As, Sn, and Al, the corrosion resistance becomes more favorable.

Preferably, the copper alloy further contains at least one of 0.015 mass % to 0.2 mass % of P, 0.015 mass % to 0.2 mass % of Sb, 0.015 mass % to 0.15 mass % of As, and at least one of 0.3 mass % to 1.0 mass % of Sn and 0.45 mass % to 1.2 mass % of Al, and the content of Cu [Cu] mass %, the content of Si [Si] mass %, the content of P [P] mass %, the content of Sb [Sb] mass %, the content of As [As] mass %, the content of Sn [Sn] mass %, and the content of Al [Al] mass % satisfy $63.5 \leq [Cu]-3.6\times[Si]-3\times[P]-0.3\times[Sb]+0.5\times[As]-1\times[Sn]-1.9\times[Al] \leq 67.5$.

Since the copper alloy contains 0.3 mass % or more of Sn or 0.45 mass % or more of Al, the erosion and corrosion resistance becomes favorable.

Preferably, the copper alloy further contains at least one of 0.003 mass % to 0.25 mass % of Pb and 0.003 mass % to 0.30 mass % of Bi, and the content of Cu [Cu] mass %, the content of Si [Si] mass %, the content of P [P] mass %, the content of Sb [Sb] mass %, the content of As [As] mass %, the content of Sn [Sn] mass %, the content of Al [Al] mass %, the content of Pb [Pb] mass %, and the content of Bi [Bi] mass % satisfy $62.0 \leq [Cu]-3.6\times[Si]-3\times[P]-0.3\times[Sb]+0.5\times[As]-1\times[Sn]-1.9\times[Al]+0.5\times[Pb]+0.5\times[Bi] \leq 67.5$.

Since the copper alloy includes at least one of Pb and Bi, the machinability becomes favorable.

Preferably, the copper alloy further contains at least one of 0.05 mass % to 2.0 mass % of Mn, 0.05 mass % to 2.0 mass % of Ni, 0.003 mass % to 0.3 mass % of Ti, 0.001 mass % to 0.1 mass % of B, and 0.0005 mass % to 0.03 mass % of Zr, and the content of Cu [Cu] mass %, the content of Si [Si] mass %, the content of P [P] mass %, the content of Sb [Sb] mass %, the content of As [As] mass %, the content of Sn [Sn] mass %, the content of Al [Al] mass %, the content of Pb [Pb] mass %, the content of Bi [Bi] mass %, the content of Mn [Mn] mass %, the content of Ni [Ni] mass %, the content of Ti [Ti] mass %, the content of B [B] mass %, and the content of Zr [Zr] mass % satisfy $62.0 \leq [Cu]-3.6\times[Si]-3\times[P]-0.3\times[Sb]+0.5\times[As]-1\times[Sn]-1.9\times[Al]+0.5\times[Pb]+0.5\times[Bi]+2\times[Mn]+1.7\times[Ni]+1\times[Ti]+2\times[B]+2\times[Zr] \leq 67.5$.

Since the copper alloy contains at least one of Mn, Ni, Ti, B, and Zr, the strength further improves.

Preferably, the copper alloy has a material strength of 400 N/mm$^2$ or more in terms of tensile strength or 150 N/mm$^2$ or more in terms of proof stress.

Since the copper alloy has a high material strength, it is possible to reduce the costs through a decrease in the thickness and the like.

The invention provides a brazed structure having any of the above pressure resistant and corrosion resistant copper alloys, another material brazed to the copper alloy, and a brazing filler metal that brazes the copper alloy and the another material. Further, an integrated article of the brazed copper alloy, the other material, and the brazing filler metal is referred to as a brazed structure.

Since the strength of the copper alloy is high, the pressure resistance of the brazed structure increases.

In addition, the inventors studied brazing methods. In Cu—Zn alloys of the related art or Patent Document 1, the β phase was decreased by bringing the copper alloy to a high temperature state through brazing or the like and then slowly cooling the copper alloy, or performing a thermal treatment for a long period of time at a temperature lower than the brazing temperature; however, as a result of the studies of this time, it was found that, in the copper alloy according to the invention having the above composition, when the cooling rate after the brazing is set within a predetermined range, the metallic structure at the brazed portion includes at least the κ phase in the α phase matrix, and the area fraction of the α phase "α"%, the area fraction of the β phase "β"%, the area fraction of the γ phase "γ"%, the area fraction of the κ phase "κ"%, and the area fraction of the μ phase "μ"% satisfy $30 \leq "α" \leq 84$, $15 \leq "κ" \leq 68$, $"α"+"κ" \geq 92$, $0.2 \leq "κ"/"α" \leq 2$, 0≤"β"≤3, 0≤"μ"≤5, 0≤"β"+"μ"≤6, 0≤"γ"≤7, and 0≤"β"+"μ"+"γ"≤8 even without the above special thermal treatment. That is, the invention provides a method of manufacturing the brazed structure, in which, in a state in which the brazing filler metal is interposed between the copper alloy and the other material, the brazed portion of the copper alloy, the brazed portion of the other material, and the brazing filler metal are heated to at least 700° C. or higher so as to be brazed, and the brazed portion of the copper alloy is cooled at an average cooling rate of 0.1° C./second to 60° C./second in a temperature range from the material temperature when brazing ends to 300° C., or from 700° C. to 300° C.

The area fractions of the respective phases, such as the α phase and the β phase in the metallic structure, become within the above ranges, and high pressure resistance and excellent corrosion resistance can be obtained.

In addition, the invention provides a method of manufacturing the brazed structure, in which, in a state in which the brazing filler metal is interposed between the copper alloy and the other material, the brazed portion of the copper alloy, the brazed portion of the other material, and the brazing filler metal are heated to at least 750° C. or higher so as to be brazed, and the brazed portion of the copper alloy is cooled at an average cooling rate of 1.5° C./second to 40° C./second in a temperature range from the material temperature when brazing ends to 300° C., or from 700° C. to 300° C.

The area fractions of the respective phases, such as the α phase and the β phase in the metallic structure, become within the above ranges, and high pressure resistance and excellent corrosion resistance can be obtained.

Effects of the Invention

According to the present invention, in a pressure resistant and corrosion resistant copper alloy brazed to another material, high pressure resistance and excellent corrosion resistance can be obtained.

DETAILED DESCRIPTION OF THE INVENTION

Figure 1A:
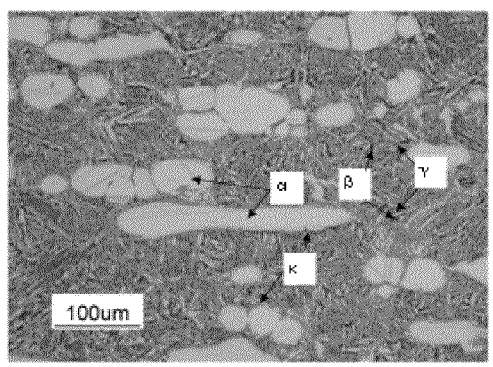
FIGS. 1A to 1D are photos of the metallic structures of copper alloys according to embodiments of the invention.

Best Mode for Carrying Out the Invention

A copper alloy according to the embodiment of the invention will be described. As the copper alloy according to the invention, first to fourth invention alloys are proposed. In order to indicate an alloy composition, in the present specification, an element symbol in a parenthesis of [ ] such as [Cu] represents the content (mass %) of the corresponding element. In addition, in the specification, a plurality of computation formulae is proposed using the method of indicating the content; however, in the computation formulae, elements that are not included are considered to be zero in computation. In addition, a symbol showing a metallic structure in a parenthesis of " " such as "α" represents the area fraction (%) of the corresponding metallic structure. In addition, the first to fourth invention alloys are collectively referred to as the "invention alloys."

The first invention alloy has an alloy composition containing 73.0 mass % to 79.5 mass % of Cu and 2.5 mass % to 4.0 mass % of Si with a remainder composed of Zn and inevitable impurities, in which the content of Cu [Cu] mass % and the content of Si [Si] mass % have a relationship of 62.0≤[Cu]−3.6×[Si]≤67.5.

The second invention alloy has the same composition ranges of Cu and Si as for the first invention alloy, and further contains at least one of 0.015 mass % to 0.2 mass % of P, 0.015 mass % to 0.2 mass % of Sb, 0.015 mass % to 0.15 mass % of As, 0.03 mass % to 1.0 mass % of Sn, and 0.03 mass % to 1.5 mass % of Al, in which the content of Cu [Cu] mass %, the content of Si [Si] mass %, the content of P [P] mass %, the content of Sb [Sb] mass %, the content of As [As] mass %, the content of Sn [Sn] mass %, and the content of Al [Al] mass % satisfy 62.0≤[Cu]−3.6×[Si]−3×[P]−0.3×[Sb]+0.5×[As]−1×[Sn]−1.9×[Al]≤67.5.

The third invention alloy has the same composition ranges of Cu, Si, P, Sb, As, Sn, and Al as for the first or second invention alloy, and further contains at least one of 0.003 mass % to 0.25 mass % of Pb and 0.003 mass % to 0.30 mass % of Bi, in which the content of Cu [Cu] mass %, the content of Si [Si] mass %, the content of P [P] mass %, the content of Sb [Sb] mass %, the content of As [As] mass %, the content of Sn [Sn] mass %, the content of Al [Al] mass %, the content of Pb [Pb] mass %, and the content of Bi [Bi] mass % satisfy 62.0≤[Cu]−3.6×[Si]−3×[P]−0.3×[Sb]+0.5×[As]−1×[Sn]−1.9×[Al]+0.5×[Pb]+0.5×[Bi]≤67.5.

The fourth invention alloy has the same composition ranges of Cu, Si, P, Sb, As, Sn, Al, Pb, and Bi as for the first, second, or third invention alloy, and further contains at least one of 0.05 mass % to 2.0 mass % of Mn, 0.05 mass % to 2.0 mass % of Ni, 0.003 mass % to 0.3 mass % of Ti, 0.001 mass % to 0.1 mass % of B, and 0.0005 mass % to 0.03 mass % of Zr, in which the content of Cu [Cu] mass %, the content of Si [Si] mass %, the content of P [P] mass %, the content of Sb [Sb] mass %, the content of As [As] mass %, the content of Sn [Sn] mass %, the content of Al [Al] mass %, the content of Pb [Pb] mass %, the content of Bi [Bi] mass %, the content of Mn [Mn] mass %, the content of Ni [Ni] mass %, the content of Ti [Ti] mass %, the content of B [B] mass %, and the content of Zr [Zr] mass % satisfy 62.0≤[Cu]−3.6×[Si]−3×[P]−0.3×[Sb]+0.5×[As]−1×[Sn]−1.9×[Al]+0.5×[Pb]+0.5×[Bi]+2×[Mn]+1.7×[Ni]+1×[Ti]+2×[B]+2×[Zr]≤67.5.

Next, the reasons why the respective elements are added will be described. Cu is a major element that composes the present invention alloy, and also has a relationship with Si. In a copper alloy after brazing, the content of Cu needs to be 73.0 mass % or more, is more preferably 73.5 mass % or more, and is optimally 74.0 mass % or more in order to prevent or suppress to the minimum extent appearance of a β phase which has an influence on the corrosion resistance, suppress precipitation of a γ phase to a necessary amount, and have excellent pressure resistance, ductility, and impact characteristics after brazing. On the other hand, while the relationship with Si may have an effect, even when Cu is included at more than 79.5 mass %, the corrosion resistance of a brazed copper alloy becomes saturated, conversely, a problem occurs with the pressure resistance, and, furthermore, problems occur with castability, forgeability, and machinability when a non-brazed copper alloy is formed. The more preferable upper limit value is 79.0 mass %.

Si is a major element that composes the invention alloy together with Cu and Zn. When the content of Si is less than 2.5 mass %, in a brazed copper alloy, solid solution hardening through Si or formation of the κ phase becomes insufficient, and therefore the pressure resistance deteriorates, and a problem occurs with the corrosion resistance. In addition, the machinability deteriorates when a non-brazed copper alloy is formed. The content of Si is more preferably 2.7 mass % or more. On the other hand, even when Si is included at more than 4.0 mass %, the pressure resistance of a brazed copper alloy is saturated, and the fraction of the α phase decreases, and therefore ductility, corrosion resistance, and impact characteristics deteriorate. In addition, when a non-brazed copper alloy is formed, the fractions of the κ phase and the γ phase increase, and the fraction of the α phase decreases, and therefore a problem occurs with machinability, castability, or forgeability. In addition, in a brazed metallic structure, the β phase, which is harmful to corrosion resistance and the like, becomes liable to be formed, the μ phase and the γ phase increase, and corrosion resistance, ductility, and impact characteristics deteriorate. As a result, the content of Si is more preferably 3.8 mass % or less.

P, Sb, and As are necessary to improve corrosion resistance. P, Sb, and As all improve the corrosion resistance of the α phase, and particularly As and P have a large improvement effect. Meanwhile, Sb improves the corrosion resistance of the κ phase, and also improves the corrosion resistance of the μ phase, the γ phase, and the β phase. P and As improve the corrosion resistance of the κ phase, but the effect is smaller than Sb, and the corrosion resistance of the μ phase, the γ phase, and the β phase slightly improves. In addition, P refines the crystal grains of a hot-forged product, refines the crystal grains of a cast metal when added with Zr, and suppresses the growth of the crystal grains even when the cast metal is brazed. In consideration of the pressure resistance and corrosion resistance of a cast metal or a forged product after brazing, P or As and Sb are preferably added in combination. When the content of any of P, Sb, and As is less than 0.015 mass %, the effect of improving corrosion resistance or strength is small. Even when 0.15 mass % of As and 0.2 mass % or more of each of Sb and P are included, the effect of corrosion resistance and the like is saturated, and the ductility after brazing is impaired.

Similarly to P, Sb, and As, Sn and Al are elements that improve corrosion resistance after brazing, and improve corrosion resistance particularly in high-speed flowing water or flowing water in which physical actions particularly occur, that is, erosion and corrosion properties, cavitation properties, and, furthermore, corrosion resistance under an environment of poor water quality. In addition, Sn and Al harden the α phase and the κ phase, and thus improve pressure resistance and abrasion resistance. In order to improve corrosion resistance or strength, Sn needs to be included at 0.03 mass % or more, preferably 0.2 mass % or more, and optimally 0.3 mass % or more. On the other hand, when Sn is included at more than 1.0 mass %, the improvement effect is saturated, the amount of the γ phase increases after brazing, and, conversely, elongation is impaired, and therefore Sn is included at more preferably 0.8 mass % or less. In order to improve corrosion resistance and pressure resistance, Al needs to be included at 0.03 mass % or more, preferably 0.25 mass % or more, and optimally 0.45 mass % or more. On the other hand, when Al is included at more than 1.5 mass %, the effect is almost saturated, castability or ductility is impaired, and ductility after brazing is impaired, and therefore Al is included at preferably 1.2 mass % or less and optimally 0.9 mass % or less. Since Sn and Al both have an effect of improving the corrosion resistance of the respective phases, and mainly improve corrosion resistance, erosion properties, cavitation properties, and the like, in flowing water in which physical actions occur, in a case in which Sn and Al are included as a more preferable embodiment, one or more of P, Sb, and As which improve the corrosion resistance of the α phase, the κ phase, the μ phase, the γ phase, and the β phase are preferably included. In addition, when Sn is included at 0.3 mass % or more, or Al is included in an amount in the optimal range of 0.45 mass % or more, and the copper alloy is cooled from a high temperature of 700° C. or 750° C. or higher at which brazing is performed, the fraction of the γ phase abruptly increases. The γ phase in an alloy containing a large amount of Sn and Al includes Sn and Al in an amount larger than the content of Sn and Al included in the alloy, that is, Sn and Al are more concentrated in the γ phase. An increase in the γ phase in which Sn and Al are included at a high concentration improves erosion and corrosion properties and the like, but degrades ductility or impact characteristics. In order to satisfy both a significant improvement in erosion and corrosion properties and high ductility, it is necessary to adjust the K value described below or the metallic structure of the phase ratio such as κ/α and the like.

Pb and Bi are added in a case in which a cutting process is performed when a valve or the like is molded, particularly a case in which excellent machinability is required. When predetermined amounts of Cu, Si, and Zn are mixed into the invention alloy, Pb and Bi exhibit the effect from a content of 0.003 mass % or more respectively. Meanwhile, since Pb is harmful to human bodies, Bi is a rare metal, and, furthermore, ductility or impact characteristics after brazing deteriorate due to Pb and Bi, the content of Pb remains at 0.25 mass % or less. The content of Pb is preferably 0.15 mass % or less, and more preferably 0.08 mass % or less. Similarly, since Bi is also a rare metal, the content of Bi is preferably 0.2 mass % or less, and more preferably 0.1 mass % or less. Furthermore, the total content of a combination of Pb and Bi is preferably 0.25 mass % or less, and more preferably 0.15 mass % or less. In addition, Pb and Bi are present as particles without forming solid solutions in the matrix; however, when Pb and Bi are added together, both elements are present together such that the melting point of the combined material decreases, and there is a concern that the copper alloy may crack during a cooling process of brazing or cutting work of a material. In consideration of the characteristics of the coexisting particles of Pb and Bi, in a case in which both elements are included at 0.02 mass % or more respectively, $7 \leq [Bi]/[Pb]$ is preferable, or $0.35 \geq [Bi]/[Pb]$ is preferable.

Mn and Ni form intermetallic compounds mainly with Si so as to improve pressure resistance and abrasion resistance after brazing. Therefore, Mn and Ni need to be added at 0.05 mass % or more respectively. On the other hand, when Mn and Ni are added at more than 2.0 mass % respectively, the effect is almost saturated, machinability degrades, and ductility and impact characteristics after brazing deteriorate.

Ti and B improve the strength of the copper alloy with addition of a small amount. The strength is improved mainly by refining crystal grains at a step of a forged product and a cast metal so as to suppress the growth of crystal grains even after brazing. Since the effect is exhibited when Ti is included at 0.003 mass % and B is included at 0.001 mass % or more, the effect is saturated even when Ti is included at more than 0.3 mass %, and B is included at more than 0.1 mass %, and, moreover, since Ti and B are active metals, inclusion of oxides becomes liable to occur during dissolution in the atmosphere, and therefore Ti is included at preferably 0.2 mass % or less, and B is included at preferably 0.05 mass % or less.

Zr improves the strength of the copper alloy with addition of a small amount. The strength is improved mainly in the following manner: crystal grains are significantly refined at a step of a cast metal, and the crystal grains remain in a fine state even after brazing so that a high strength is obtained due to crystal grain refinement. The effect is exhibited when Zr is included at an extremely small amount of 0.0005 mass % or more, the effect is saturated even when Zr is included at more than 0.03 mass %, and, moreover, the refinement of crystal grains is impaired. Further, the effect of crystal grain refinement by Zr is particularly exhibited when P is added together, and the mixing ratio of Zr to P is important, and therefore the effect is more significantly exhibited when $1 \leq [P]/[Zr] \leq 80$ is satisfied.

Next, other impurities will be described. The copper alloy is excellent in terms of recyclability, is collected at a high recycling rate and recycled, but there is a problem in that another copper alloy may be incorporated during recycling or Fe and the like may be inevitably incorporated due to abrasion of a tool during, for example, cutting work. Therefore, with regard to elements standardized as impurities in a variety of standards such as JIS, the standards of impurities are applied to the present alloy. For example, like the free-machining copper alloy rod C3601 described in copper and copper alloy rods of JIS H 3250, 0.3 mass % or less of Fe is treated as an inevitable impurity.

Next, the relationships among the respective elements will be described. In the relationships of Cu and Si or selectively included P, Pb, and the like in the copper alloy, in order to have a high strength even after brazing, have excellence in terms of impact characteristics or ductility, and obtain a favorable metallic structure that has a large influence on characteristics, when $$K=[Cu]-3.6\times[Si]-3\times[P]-0.3\times[Sb]+0.5\times[As]-1\times[Sn]-1.9\times[Al]+0.5\times[Pb]+0.5\times[Bi]+2\times[Mn]+1.7\times[Ni]+1\times[Ti]+2\times[B]+2\times[Zr],$$

the following formula $62.0 \leq K \leq 67.5$ must be satisfied.

Furthermore, the coefficients of the respective elements are obtained from experiment results, and, furthermore, in a case in which elements other than the above, for example, Fe and the like, are inevitably included, when the total of the contents of the impurities is 0.7 mass % or less, the elements may be considered to have no influence. Meanwhile, a preferable range is $62.7 \leq K \leq 66.8$ considering the influence of the impurities to the maximum extent. Furthermore, while the K value is influenced when the total of the contents of the impurities exceeds 0.7 mass %, in a case in which the total of the contents of the impurities exceeds 0.7 mass %, when the total of the contents of the impurities is set to X mass %, the range may be set to $62.0+(X-0.7) \leq K \leq 67.5-(X-0.7)$, that is, $61.3+X \leq K \leq 68.2-X$, and more preferably to $61.8+X \leq K \leq 67.7-X$. When the K value is lower than 62.0, macro crystal grains coarsen during high-temperature heating, the fraction of the β phase precipitating at a high temperature increases, and the β phase remains to a large extent regardless of the cooling rate. In addition, since formation of the γ phase is accelerated, impact characteristics and ductility decrease, and corrosion resistance also deteriorates. In addition, pressure resistance and tensile strength also slightly decrease. When the K value is higher than 67.5, the fraction of the α phase excessively increases, and, since the α phase originally has a low strength, and the crystal grains of the α phase grow during high-temperature heating, pressure resistance, tensile strength, and proof stress decrease. Due to the above facts, preferably, the K value has a lower limit side of preferably 62.5 or more and optimally 63.0 or more, and an upper limit side of preferably 67.0 or less and optimally 66.5 or less. In addition, in a case in which 0.3 mass % or more of Sn and 0.45 mass % or more of Al are included, the lower limit side of the K value is preferably 63.5 or more, and optimally 64.0 or more in consideration of impurities and the like. Since formation of a small amount of the γ phase increases the strength, the upper limit side may be 67.5 or less, and optimally 67.0 or less in consideration of impurities and the like. As such, in order to have excellent characteristics even after brazing, a composition management within a narrow range is required. Furthermore, when the total content of Pb and Bi exceeds 0.003 mass %, impact characteristics, ductility, and tensile strength begin to decrease. Particularly, inclusion of Pb and the like has a large influence on impact characteristics and ductility, the range of the K value needs to be set to be narrow, and, particularly, a value on the lower limit value side must be increased. Therefore, in a case in which Pb and Bi are included, preferably $62.0+3([Pb]+[Bi]-0.003) \leq K \leq 67.5-2([Pb]+[Bi]-0.003)$, and more preferably $62.5+3([Pb]+[Bi]-0.003) \leq K \leq 67.0-2([Pb]+[Bi]-0.003)$. In addition, in a case in which cutting work is performed when a valve and the like are molded, when the K value does not fall within a range of $62.0+3([Pb]+[Bi]-0.003) \leq K \leq 67.5-2([Pb]+[Bi]-0.003)$, excellent machinability cannot be obtained with the small amount of Pb and/or the amount of Bi which are specified in the application.

Next, the metallic structure of the brazed portion after brazing will be described. In order to obtain high pressure resistance, ductility, impact characteristics, and corrosion resistance after brazing, the metallic structure as well as the composition becomes important. That is, the brazed metallic structure includes at least the κ phase in the α phase matrix, and $30 \leq$ "α" $\leq 84$, $15 \leq$ "κ" $\leq 68$, "α"+"κ" $\geq 92$, $0.2 \leq$ "κ"/"α" $\leq 2$, "β" $\leq 3$, "μ" $\leq 5$, "β"+"μ" $\leq 6$, $0 \leq$ "γ" $\leq 7$, and $0 \leq$ "β"+"μ"+"γ" $\leq 8$, are all satisfied. In the metallic structure, when the total of the area fraction of two major phases, the α phase and the κ phase is less than 92%, high pressure resistance, ductility, or impact characteristics cannot be secured, and corrosion resistance also becomes insufficient. Basically the α phase is the matrix, the α phase is very ductile and corrosion-resistant, and the α phase is surrounded by the κ phase or the α phase and the κ phase are uniformly mixed into the brazed metallic structure so that the crystal grain growth of both the α phase and the κ phase is suppressed, high pressure resistance is obtained, and high ductility, impact characteristics, and, at the same time, excellent corrosion resistance are obtained. Further, in order to make the above characteristics superior, preferably "α"+"κ" $\geq 94$, and most preferably "α"+"κ" $\geq 95$. In addition, the α phase and the κ phase preferably form a metallic structure in which the α phase is surrounded by the κ phase or the α phase and the κ phase are uniformly mixed, and are important to obtain high pressure resistance, high ductility, impact characteristics, and excellent corrosion resistance. That is, when "κ"/"α" is less than 0.2, the α phase becomes excessive, and ductility, corrosion resistance, and impact properties become excellent due to the crystal grain growth of the α phase, but pressure resistance is low. "κ"/"α" is preferably 0.3 or more, and optimally 0.5 or more. Meanwhile, "κ"/"α" exceeds 2, the κ phase becomes excessive, a problem occurs particularly with ductility, impact characteristics deteriorate, and improvement of pressure resistance is also saturated. "κ"/"α" is preferably 1.5 or less, and optimally 1.2 or less. Therefore, $0.2 \leq$ "κ"/"α" $\leq 2$ and "α"+"κ" $\geq 92$, and, furthermore, in order to achieve $0.3 \leq$ "κ"/"α" $\leq 1.5$, "α"+"κ" $\geq 94$ as a preferable range, not only the composition but also the cooling rate after brazing must be sufficiently managed as described below. Furthermore, in order to obtain high pressure resistance, ductility, impact characteristics, and corrosion resistance after brazing, the range of the α phase is 30% to 84%, more preferably 35% to 78%, and optimally 42% to 72%, and the range of the κ phase is 15% to 65%, more preferably 20% to 62%, and optimally 25% to 55%. Meanwhile, in a case in which Sn is included at 0.3 mass % or more and Al is included at 0.45 mass % or more, the fraction of the γ phase increases, and therefore, as a preferable metallic structure, $38 \leq$ "α" $\leq 84$, $15 \leq \text{"}\kappa\text{"} \leq 60$, $\text{"}\alpha\text{"}+\text{"}\kappa\text{"} \geq 92$, $0.2 \leq \text{"}\kappa\text{"}/\text{"}\alpha\text{"} \leq 1.5$, $\text{"}\beta\text{"} \leq 1.5$, $\text{"}\mu\text{"} \leq 2.5$, $\text{"}\beta\text{"}+\text{"}\mu\text{"} \leq 3$, $0 \leq \text{"}\gamma\text{"} 7$, and $0 \leq \text{"}\beta\text{"}+\text{"}\mu\text{"}+\text{"}\gamma\text{"} \leq 8$.

The β phase and the μ phase both impair the ductility, corrosion resistance, impact characteristics, and pressure resistance of the brazed copper alloy. Singularly, when the β phase exceeds 3%, corrosion resistance is adversely influenced, and ductility and impact characteristics are also adversely influenced. The β phase is preferably 1.5% or less, and optimally 0.5% or less. Meanwhile, when the μ phase exceeds 5%, corrosion resistance, ductility, pressure resistance, and impact characteristics are adversely influenced. The μ phase is preferably 2.5% or less, and optimally 0.5% or less. Furthermore, the total of the area fractions of the β phase and the μ phase in the metallic structure must be 6% or less due to an influence on corrosion resistance, ductility, and the like. Preferably, $\text{"}\beta\text{"}+\text{"}\mu\text{"} \leq 3$, and optimally $\text{"}\beta\text{"}+\text{"}\mu\text{"} \leq 0.5$.

The γ phase is a phase that improves machinability before brazing, and is a phase that improves erosion and corrosion resistance after brazing in a case in which Sn and Al are included at an appropriate amount or more; however, when the area fraction of the γ phase in the metallic structure exceeds 7% after brazing, ductility, corrosion resistance, and impact characteristics are adversely influenced. The area fraction of the γ phase is preferably 5% or less, and optimally 3% or less. However, pressure resistance improves when a small amount of the γ phase is present in a dispersed state. The effect is exhibited when the γ phase exceeds 0.05%, and, when a small amount of the γ phase is distributed in a dispersed state, ductility or corrosion resistance is not adversely influenced. Therefore, $0 \leq \text{"}\gamma\text{"} \leq 7$, preferably $0 \leq \text{"}\gamma\text{"} \leq 5$, and optimally $0.05 \leq \text{"}\gamma\text{"} \leq 3$. Furthermore, the fractions of the β phase, the μ phase, and the γ phase must be evaluated using the total amount thereof. That is, when the total amount of the fractions of the β phase, the μ phase, and the γ phase exceeds 8%, ductility, corrosion resistance, impact characteristics, and pressure resistance after brazing deteriorate. The total amount of the fractions of the β phase, the μ phase, and the γ phase is preferably 5.5% or less, and optimally 3% or less. That is, the numeric formula is $0 \leq \text{"}\beta\text{"}+\text{"}\mu\text{"}+\text{"}\gamma\text{"} \leq 8$, preferably $0 \leq \text{"}\beta\text{"}+\text{"}\mu\text{"}+\text{"}\gamma\text{"} \leq 5.5$, and optimally $0.05 \leq \text{"}\beta\text{"}+\text{"}\mu\text{"}+\text{"}\gamma\text{"} \leq 3$.

Furthermore, the respective phases of α, κ, γ, β, and μ can be defined as follows in a Cu—Zn—Si alloy which is the basis of the invention from the quantitative analysis results obtained using an X-ray micro analyzer. The α phase of the matrix includes Cu: 73 mass % to 80 mass % and Si: 1.7 mass % to 3.1 mass % with a remainder of Zn and other added elements. The typical composition is 76Cu-2.4Si-remainder: Zn. The κ phase which is an essential phase includes Cu: 73 mass % to 79 mass % and Si: 3.2 mass % to 4.7 mass % with a remainder of Zn and other added elements. The typical composition is 76Cu-3.9Si-remainder: Zn. The γ phase includes Cu: 66 mass % to 75 mass % and Si: 4.8 mass % to 7.2 mass % with a remainder of Zn and other added elements. The typical composition is 72Cu-6.0Si-remainder: Zn. The β phase includes Cu: 63 mass % to 72 mass % and Si: 1.8 mass % to 4.0 mass % with a remainder of Zn and other added elements. The typical composition is 69Cu-2.4Si-remainder: Zn. The μ phase includes Cu: 76 mass % to 89 mass % and Si: 7.3 mass % to 11 mass % with a remainder of Zn and other added elements. The typical composition is 83Cu-9.0Si-remainder: Zn. As such, the μ phase is differentiated from the α phase, the κ phase, the γ phase, and the β phase using the Si concentration, and the γ phase is differentiated from the α phase, the κ phase, the β phase, and the μ phase using the Si concentration. The μ phase and the γ phase are close in terms of the content of Si, but are differentiated at the boundary of a Cu concentration of 76%. The β phase is differentiated from the γ phase using the Si concentration, and is differentiated from the α phase, the κ phase, and the μ phase using the Cu concentration. The α phase and the κ phase are close, but differentiated at the boundary of a Si concentration of 3.15 mass % or 3.1 mass % to 3.2 mass %. In addition, in investigation of the crystal structures using EBSD (electron backscatter diffraction), the α phase is fcc, the β phase is bcc, the γ phase is bcc, and the κ phase is hcp, which can be differentiated respectively. Meanwhile, the β phase has a CuZn-form, that is, a W-form bcc structure, and the γ phase has a $Cu_5Zn_8$-form bcc structure so that both are differentiated. Originally, the crystal structure of the κ phase: hcp has poor ductility, and, when $0.2 \leq \text{"}\kappa\text{"}/\text{"}\alpha\text{"} \leq 2$ is satisfied in the presence of the α phase, favorable ductility is obtained. Furthermore, the fractions of phases in the metallic structure are shown, but non-metallic inclusions, Pb particles, Bi particles, a compound of Ni and Si, and a compound of Mn and Si are not included.

Next, the cooling rate after brazing will be described. The cooling rate after brazing is a condition for obtaining high pressure resistance and excellent corrosion resistance. That is, in order to obtain high pressure resistance and excellent corrosion resistance, it is necessary to heat a copper alloy such as a valve to 700° C. or higher, furthermore, 750° C. or higher or approximately 800° C. using the brazing temperature of approximately 800° C., and cool the copper alloy at an average of a cooling rate of 0.1° C./second to 60° C./second in temperature range of the temperature of the copper alloy after the end of brazing to 300° C. or 700° C. to 300° C. When the cooling rate is slower than 0.1° C./second, the μ phase precipitates in crystal grain boundaries, the crystal growth of the α phase and the crystal growth of the κ phase, depending on circumstances, occur, and ductility, impact characteristics, strength, pressure resistance, and corrosion resistance degrade. Furthermore, in order to prevent the precipitation of the μ phase that has an adverse influence on corrosion resistance and suppress the crystal grain growth of the α phase and the κ phase which encourage degradation of pressure resistance, cooling is performed at a cooling rate of preferably 0.8° C./second or more and optimally 1.5° C./second or more after brazing. Particularly, since the μ phase is easily generated at 300° C. to 450° C., the copper alloy is preferably cooled at a cooling rate of 0.1° C./second or more in the above temperature range. In a temperature area lower than 300° C., the μ phase rarely precipitates even when the cooling rate is slower than 0.1° C./second, for example, 0.02° C./second. In addition, the μ phase rarely precipitates even when the copper alloy is held for 1 hour at approximately 250° C. in the cooling process. On the other hand, when the cooling rate is faster than 60° C./second, since the β phase remains to a large extent, corrosion resistance deteriorates, and ductility and impact characteristics also degrade. In order to eliminate the remaining of the β phase that adversely influences corrosion resistance and the like, cooling after brazing is preferably performed at a cooling rate of 40° C./second or less.

As described above, brazing produces a high joint strength, but has a high melting point such that the copper alloy is also heated to a high temperature, and thus strength and pressure resistance decrease, and corrosion resistance and other characteristics degrade. Some copper-based hard solders contain a large amount of Ag. A hard solder including several tens of percentage of Ag has an effect of decreasing the melting point by 100° C. compared to a hard solder including no Ag. However, since Ag is extremely expensive, there is a large problem regarding economic efficiency even when a slight amount of Ag is used. The brazing temperature is approximately 800° C. when a hard solder including no Ag or including approximately 10% of Ag is used, and a copper alloy such as a valve is also heated to approximately 800° C., at least 750° C. or higher. Since a copper alloy is heated to approximately 800° C., at least 750° C. or higher during brazing, the cooling rate of the brazed copper alloy is 0.8° C./second to 40° C./second, and more preferably 1.5° C./second to 40° C./second in a temperature range of 700° C. to 300° C.

Furthermore, in a case in which a pressure is applied to the inner surface, when t represents the minimum thickness of a pipe, P represents a design pressure, D represents the outer diameter of the pipe, A represents the acceptable tensile strength of a material, and b represents the efficiency of a welded joint, $$t=PD/(200Ab+0.8P).$$

That is, since the pressure P depends on the acceptable tensile strength, and the acceptable tensile strength depends on the tensile strength of a material, when the tensile strength of the material is high, the material can endure a high pressure. In addition, when the initial deformation strength of a pressure-resistant vessel becomes a problem, it is also possible to use proof stress instead of tensile strength. Therefore, the pressure resistance of the pressure-resistant vessel depends on the tensile strength and proof stress of a brazed material, and the thickness of the pressure-resistant vessel can be thin when the values thereof are high so that the pressure-resistant vessel can be manufactured at low cost. Based on the above, tensile strength and proof stress can be used as an index that indicates high pressure resistance.

EXAMPLES

Specimens L, M, and N were manufactured using the copper alloys of the first to fourth invention alloys and a copper alloy having a composition for comparison. Table 1 shows the compositions of the copper alloys of the first to fourth invention alloys and the copper alloy for comparison, which were used to manufacture the specimens. The specimen L was obtained by heating an ingot (cylindrical ingot having an outer diameter of 100 mm and a length of 150 mm) having the composition in Table 1 to 670° C. and extruding the ingot into a round bar shape having an outer diameter of 17 mm (extruded material). The specimen M was obtained by heating an ingot (cylindrical ingot having an outer diameter of 100 mm and a length of 150 mm) having the composition in Table 1 to 670° C., extruding the ingot into a round bar shape having an outer diameter of 35 mm, then, heating the rod to 670° C., placing the rod horizontally, hot forging the rod into a thickness of 17.5 mm, and cutting the hot-forged material into a round bar material having an outer diameter of 17 mm (hot-forged material). The specimen N was obtained by pouring molten metal having the composition in Table 1 into a mold having a diameter of 35 mm and a depth of 200 mm, casting the molten metal, cutting the cast molten metal at a lathe so as to have the same size as the specimen L, and producing a round bar having an outer diameter of 17 mm (cast material).

TABLE 1

| Alloy | No. | Alloy composition (mass %) | | | | | | | | | | | | | | |
|---|---|---|---|---|---|---|---|---|---|---|---|---|---|---|---|---|
| | | Cu | Si | P | Sb | As | Zn | Sn | Al | Pb | Bi | Zr | Mn | Ni | Ti | B | K* |
| First invention alloy | A11 | 75.1 | 3.0 | | | | Rem. | | | | | | | | | | 64.30 |
| Second invention alloy | A21 | 77.3 | 3.3 | 0.07 | | | Rem. | | | | | | | | | | 65.21 |
| | A22 | 76.4 | 3.2 | 0.04 | 0.08 | | Rem. | | | | | | | | | | 64.74 |
| | A23 | 75.4 | 3.2 | 0.09 | | | Rem. | | | | | | | | | | 63.61 |
| | A24 | 77.1 | 2.8 | | 0.07 | 0.03 | Rem. | | | | | | | | | | 67.01 |
| | A25 | 75.7 | 3.5 | 0.08 | | 0.04 | Rem. | | | | | | | | | | 62.88 |
| | A26 | 77.0 | 3.0 | | 0.11 | 0.04 | Rem. | 0.33 | | | | | | | | | 65.86 |
| | A27 | 76.6 | 2.9 | | | | Rem. | 0.42 | 0.05 | | | | | | | | 65.65 |
| | A28 | 76.4 | 3.1 | | 0.06 | 0.07 | Rem. | 0.48 | 0.06 | | | | | | | | 64.66 |
| | A29 | 77.1 | 3.0 | | 0.1 | 0.05 | Rem. | 0.35 | | | | 0.26 mass % of Fe is included | | | | | 65.95 |
| Third invention alloy | A31 | 75.5 | 3.1 | | 0.08 | | Rem. | | | 0.025 | | | | | | | 64.33 |
| | A32 | 77.8 | 3.2 | | | 0.06 | Rem. | | | 0.06 | | | | | | | 66.34 |
| | A33 | 76.6 | 2.8 | | 0.08 | | Rem. | | 0.63 | 0.09 | | | | | | | 65.34 |
| | A34 | 78.1 | 3.2 | | | 0.05 | Rem. | 0.08 | 0.48 | | 0.03 | | | | | | 65.63 |
| Fourth invention alloy | A41 | 76.5 | 3.1 | 0.09 | | | Rem. | | | 0.015 | 0.008 | | | | | | 65.09 |
| | A42 | 75.2 | 3.0 | | 0.06 | 0.03 | Rem. | | | | | | | | 0.03 | 0.01 | 64.44 |
| | A43 | 77.7 | 3.3 | 0.08 | 0.05 | | Rem. | 0.42 | | | 0.005 | | | | | | 65.16 |
| | A44 | 73.9 | 3.4 | | | 0.11 | Rem. | | | 0.12 | 0.01 | | 1.6 | | | | 64.98 |
| | A45 | 75.8 | 3.8 | | 0.08 | | Rem. | | | 0.75 | 0.006 | | | 1.5 | 0.3 | | 64.18 |
| Comparative alloy | 101 | 78.4 | 4.2 | | | 0.04 | Rem. | | | 0.01 | | | | | | | 63.31 |
| | 102 | 74.0 | 2.3 | 0.08 | 0.05 | | Rem. | | | 0.02 | | | | | | | 65.48 |
| | 103 | 77.9 | 2.7 | 0.05 | | 0.05 | Rem. | | | | | | | | | | 68.06 |
| | 104 | 75.0 | 3.7 | 0.08 | | | Rem. | | | | | | | | | | 61.44 |
| | 105 | 74.1 | 3.2 | 0.14 | | | Rem. | | 0.39 | | 0.12 | 0.007 | | | | | 61.49 |
| | 110 | 85.1 | | 0.03 | | | Rem. | 4.8 | 5.3 | | | | | | | | 82.86 |
| | 111 | 85.4 | | 0.03 | | | Rem. | 5.3 | | | | 2.2 | | | | | 81.11 |
| | 112 | 60.2 | | | 0.04 | | Rem. | 0.2 | 3.0 | | | | | | | | 61.49 |
| | 113 | 59.0 | | | | | Rem. | 0.2 | 2.0 | | | | | | | | 59.80 |
| | 114 | 67.8 | | 0.05 | | | Rem. | 0.6 | 0.22 | 1.6 | | | | 0.2 | | | 67.77 |
| | 115 | 63.5 | | 0.09 | | | Rem. | 0.8 | 1.7 | | | | | | | | 63.28 |

*K = [Cu] − 3.6 × [Si] − 3 × [P] − 0.3 × [Sb] + 0.5 × [As] − 1 × [Sn] − 1.9 × [Al] + 0.5 × [Pb] + 0.5 × [Bi] + 2 × [Mn] + 1.7 × [Ni] + 1 × [Ti] + 2 × [B] + 2 × [Zr]

The following test 1 or 2 was performed on the respective specimens. Test 1: Each of the specimens was immersed in a salt bath (in which NaCl and CaCl₂ were mixed at approximately 3:2) at 800° C. for 100 seconds in order to simulate a state in which the specimen was heated using a burner during brazing. The specimen was held at approximately 800° C. for approximately 10 seconds during immersion in the salt bath. In addition, the specimen was removed and cooled under conditions of water cooling in ice water, water cooling at 10° C., warm water cooling at 60° C., and forcible air cooling A, B, and C (the rate of the fan during forcible air cooling became faster in the order of A, B, and C). In addition, in order to realize a slower cooling rate, the specimen was heated to 800° C. in an inert atmosphere using a continuous furnace (furnace brazing furnace) in which the temperature was increased and decreased continuously, held for 1 minute, and cooled in the furnace under two conditions (conditions D and E). The average cooling rates from 700° C. to 300° C. when the specimen was treated under a variety of conditions were 70° C./second for water cooling in ice water, 50° C./second for water cooling at 10° C., 35° C./second for warm water cooling at 60° C., 6.0° C./second for forcible air cooling A, 2.5° C./second for forcible air cooling B, 1.2° C./second for forcible air cooling C, 0.15° C./second for the condition D of furnace cooling, and 0.02° C./second for the condition E of furnace cooling.

Test 2: The following brazing was performed in order to measure the tensile strength at a brazed portion after the specimens L, M, and N were brazed to another material. A copper rod having an outer diameter of 25 mm was prepared as the other material, a hole having an inner diameter of 18 mm and a depth of 50 mm was formed at the center of the end surface of the copper rod through cutting, each of the specimens L, M, and N was inserted into the hole, a flux was attached to the specimen and the copper rod, the flux was melted through heating using a burner including preheating of the copper rod, and a brazing filler metal was made to become easily wet. Immediately afterwards, using a phosphor bronze brazing filler of Cu-7% P(B—CuP2), the brazing filler metal, the specimen, and the copper rod were heated to approximately 800° C. so as to melt the phosphor bronze brazing filler, and complete attachment of the phosphor bronze brazing filler to the joint portion was confirmed, thereby finishing brazing. Immediately afterwards, the specimen was cooled using the same method as for the test 1.

After the test 1 or 2 of the specimens L, M, and N, dezincification corrosion properties, erosion and corrosion resistance, tensile strength, proof stress, elongation, and impact strength were evaluated in the following manner.

Dezincification corrosion properties were evaluated in the following manner based on ISO 6509. A specimen taken from a test material produced using the method of the test 1 was implanted into a phenol resin material so that the exposed specimen surface became perpendicular to the extruding direction of the extruded material for the specimen L, was implanted in a phenol resin material so that the exposed specimen surface became perpendicular to the longitudinal direction of the hot-forged material or the cast metal for the specimens M and N, the specimen surfaces were polished using Emery paper of up to No. 1200, the specimens were ultrasonic-washed in pure water, and dried. After that, each of the specimens was immersed in an aqueous solution (12.7 g/L) of 1.0% cupric chloride dehydrate ($CuCl_{2o}.2H_2O$), held for 24 hours under a temperature condition of 75° C., then, removed from the aqueous solution, and the maximum value of the dezincification corrosion depth (maximum dezincification corrosion depth) was measured. The specimen was again implanted into a phenol resin material so that the exposed surface was held perpendicularly to the extruding direction, and then, the specimen was cut so as to obtain a longest cut portion. Subsequently, the specimen was polished, and corrosion depths were observed using metal microscopes with a magnification of 100 times to 500 times at 10 points in the field of view of the microscope. The deepest corrosion point was recorded as the maximum dezincification corrosion depth. Meanwhile, when the maximum corrosion depth is 200 µm or less in the ISO 6509 test, corrosion resistance does not cause a practical problem, and, in a case in which particularly excellent corrosion resistance is required, the maximum corrosion depth is desirably 100 µm or less, and more desirably 50 µm or less.

Erosion and corrosion resistance was evaluated in the following manner. A specimen cut from a test material produced using the method of the test 1 was used for evaluation of erosion and corrosion resistance. In the erosion and corrosion test, a 3% saline solution was impacted on the specimen at a flow rate of 11 m/second using a nozzle having an caliber of 2 mm, the cross-sectional surface was observed after 168 hours had elapsed, and the maximum corrosion depth was measured. Since a copper alloy used for a tap water supply valve, and the like, is exposed to an abrupt change in the water flow rate caused by a reverse flow or opening and closing of a valve, not only ordinary corrosion resistance but also erosion and corrosion resistance are required.

Tensile strength, proof stress, and elongation were measured using tensile tests. The shape of a specimen for the tensile test looked like a 14 A specimen having a gauge length of JIS Z 2201 of (square root of the cross sectional area of the specimen parallel portion)×5.65. For a specimen obtained by joining a copper rod and the specimen through brazing in the test 2, a tensile test was performed on the copper rod and the specimen joined through brazing. Elongation was not measured, but a tensile strength was obtained by dividing a rupture load by the cross-sectional area of a ruptured portion. In the tensile test of the copper rod and the specimen brazed, the specimens were all ruptured on the specimen side 10 mm or more away from the brazed portion.

The metallic structure was evaluated by mirror-polishing the horizontal cross-section of the specimen, etching the cross section using a liquid mixture of hydrogen peroxide and aqueous ammonia, and measuring the area fractions (%) of the α phase, the κ phase, the β phase, the γ phase, and the µ phase through image analyses. That is, the area fractions of the respective phases were obtained by digitalizing optical microscopic structures with a magnification of 200 times or 500 times using image treatment software "WinROOF." The area fractions were measured at 3 points, and the average value was used as the phase ratio of the respective phases. In a case in which it was difficult to identify phases, phases were specified using an electron back scattering diffraction pattern (FE-SEM-EBSP) method, and the area fractions of the respective phases were obtained. A JSM-7000F manufactured by JEOL Ltd. was used as the FE-SEM, an OIM-Ver. 5.1 manufactured by TSL Solutions Ltd. was used for analysis, and phases were obtained from phase maps having an analysis magnification of 500 times and 2000 times.

In an impact test, an impact specimen (a V-notch specimen according to JIS Z 224) was taken from the specimen which had undergone a thermal treatment in a salt bath of the test 1, a Charpy impact test was performed, and an impact strength was measured. Machinability was evaluated in a cutting test in which a lathe was used, which was performed using the following method. An extruded specimen having a diameter of 17 mm, a hot-forged specimen, or a cast specimen was cut on the circumstance of a lathe equipped with a point nose straight tool, particularly, a tungsten carbide tool not equipped with a chip breaker in a dry condition at a rake angle of −6 degrees, a nose radius of 0.4 mm, a cutting rate of 100 (m/min), a cutting depth of 1.0 mm, and a feed rate of 0.11 mm/rev. A signal emitted from a dynamometer composed of three portions attached to a tool was converted to an electrical voltage signal, and recorded in a recorder. Next, the signal was converted to a cutting resistance (N). Therefore, the machinability of the alloy was evaluated by measuring cutting resistance, particularly, the main component force showing the highest value during cutting.

Figure 1B:
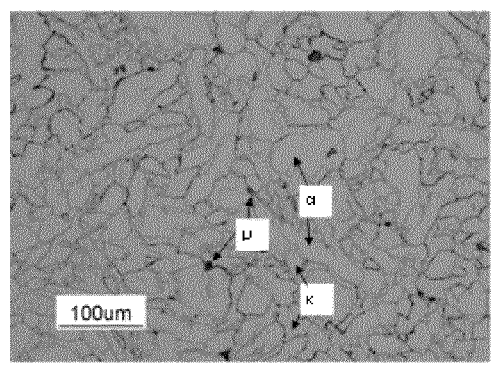
Figure 1C:
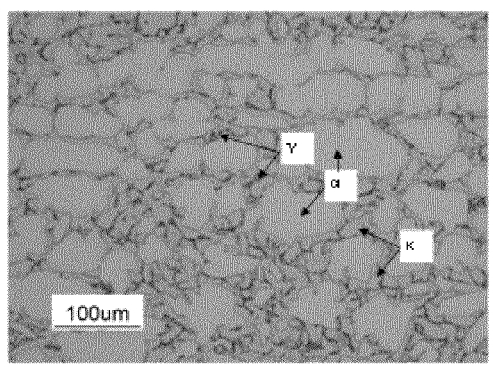
Figure 1D:
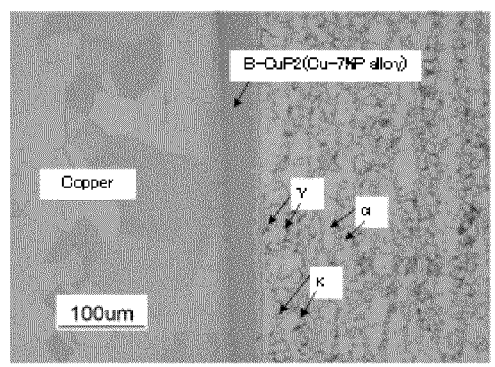

The results of the respective tests are shown in Tables 2 to 11. Tables 2 and 3, Tables 4 and 5, Tables 6 and 7, Tables 8 and 9, Tables 10 and 11, and Tables 12 and form sets, and indicate the results. Since the machinability was evaluated in a state in which the heating of the test 1 had not yet been performed, the results are described for each of the specimens L, M, and N of the respective alloys. The numeric values of 1 to 8 in the cooling rate columns in the table represent 1: water cooling in ice water (70° C./second), 2: water cooling at 10° C. (50° C./second), 3: warm water cooling at 60° C. (35° C./second), 4: forcible air cooling A (6.0° C./second), 5: forcible air cooling B (2.5° C./second), 6: forcible air cooling C (1.2° C./second), 7: condition D of furnace cooling (0.15° C./second), and 8: condition E of furnace cooling (0.02° C./second). FIGS. 1A to 1C show the metallic structures of specimens No. A11L2, A21L7, and A26L4 after the test 1 respectively, and FIG. 1C shows the metallic structure of the brazed portion of the specimen No. A11L6 after the test 2.

TABLE 2

| Test No. | Alloy No. | Specimen | Cooling rate | Area fraction (%) α | κ | γ | β | μ | Computation result α + κ | κ/α | β + μ | β + μ + γ |
|---|---|---|---|---|---|---|---|---|---|---|---|---|
| A11L1 | A11 | L | 1 | 50.7 | 42.8 | 1.6 | 4.9 | 0 | 93.5 | 0.84 | 4.9 | 6.5 |
| A11L2 | A11 | L | 2 | 55 | 42.4 | 1.7 | 0.9 | 0 | 97.4 | 0.77 | 0.9 | 2.6 |
| A11L3 | A11 | L | 3 | 57.6 | 40.7 | 1.7 | 0 | 0 | 98.3 | 0.71 | 0 | 1.7 |
| A11L4 | A11 | L | 4 | 60.3 | 37.7 | 2 | 0 | 0 | 98 | 0.63 | 0 | 2 |
| A11L5 | A11 | L | 5 | 60.7 | 37.3 | 2 | 0 | 0 | 98 | 0.61 | 0 | 2 |
| A11L6 | A11 | L | 6 | 61.6 | 36.4 | 1.8 | 0 | 0.2 | 98 | 0.59 | 0.2 | 2 |
| A11L7 | A11 | L | 7 | 61.8 | 35.4 | 1.5 | 0 | 1.3 | 97.2 | 0.57 | 1.3 | 2.8 |
| A11L8 | A11 | L | 8 | 63.5 | 28.5 | 2.2 | 0 | 5.8 | 92 | 0.45 | 5.8 | 8 |
| A11N2 | A11 | N | 2 | 54.9 | 42.4 | 2 | 0.7 | 0 | 97.3 | 0.77 | 0.7 | 2.7 |
| A11N3 | A11 | N | 3 | 56.8 | 41.2 | 2 | 0 | 0 | 98 | 0.73 | 0 | 2 |
| A11N5 | A11 | N | 5 | 59.4 | 38.8 | 1.8 | 0 | 0 | 98.2 | 0.65 | 0 | 1.8 |
| A11N6 | A11 | N | 7 | 61.7 | 35.1 | 1.8 | 0 | 1.4 | 96.8 | 0.57 | 1.4 | 3.2 |
| A11M2 | A11 | M | 2 | 54.4 | 42.5 | 2.3 | 0.8 | 0 | 96.9 | 0.78 | 0.8 | 3.1 |
| A11M3 | A11 | M | 3 | 56.5 | 41.5 | 2 | 0 | 0 | 98 | 0.73 | 0 | 2 |
| A11M5 | A11 | M | 5 | 60 | 38 | 2 | 0 | 0 | 98 | 0.63 | 0 | 2 |
| A11M7 | A11 | M | 7 | 61 | 35.9 | 2 | 0 | 1.1 | 96.9 | 0.59 | 1.1 | 3.1 |
| A21L1 | A21 | L | 1 | 46.3 | 49.5 | 0.2 | 4 | 0 | 95.8 | 1.07 | 4 | 4.2 |
| A21L2 | A21 | L | 2 | 51.4 | 47.9 | 0.4 | 0.3 | 0 | 99.3 | 0.93 | 0.3 | 0.7 |
| A21L3 | A21 | L | 3 | 54.4 | 45.1 | 0.4 | 0.1 | 0 | 99.5 | 0.83 | 0.1 | 0.5 |
| A21L4 | A21 | L | 4 | 56.3 | 43.5 | 0.2 | 0 | 0 | 99.8 | 0.77 | 0 | 0.2 |
| A21L5 | A21 | L | 5 | 57.3 | 42.5 | 0.2 | 0 | 0 | 99.8 | 0.74 | 0 | 0.2 |
| A21L6 | A21 | L | 6 | 58.7 | 40.7 | 0.3 | 0 | 0.3 | 99.4 | 0.69 | 0.3 | 0.6 |
| A21L7 | A21 | L | 7 | 59.4 | 38.8 | 0.4 | 0 | 1.4 | 98.2 | 0.65 | 1.4 | 1.8 |
| A21L8 | A21 | L | 8 | 60.5 | 30.5 | 0.5 | 0 | 8.5 | 91 | 0.50 | 8.5 | 9 |
| A21N2 | A21 | N | 2 | 50.5 | 48.6 | 0.6 | 0.3 | 0 | 99.1 | 0.96 | 0.3 | 0.9 |
| A21N3 | A21 | N | 3 | 54.2 | 45.3 | 0.5 | 0 | 0 | 99.5 | 0.84 | 0 | 0.5 |
| A21N5 | A21 | N | 5 | 56.8 | 42.8 | 0.4 | 0 | 0 | 99.6 | 0.75 | 0 | 0.4 |
| A21N7 | A21 | N | 7 | 59 | 39 | 0.5 | 0 | 1.5 | 98 | 0.66 | 1.5 | 2 |
| A21M2 | A21 | M | 2 | 51.1 | 47.9 | 0.5 | 0.5 | 0 | 99 | 0.94 | 0.5 | 1 |
| A21M3 | A21 | M | 3 | 54 | 45.3 | 0.5 | 0.2 | 0 | 99.3 | 0.84 | 0.2 | 0.7 |
| A21M5 | A21 | M | 5 | 57 | 42.7 | 0.3 | 0 | 0 | 99.7 | 0.75 | 0 | 0.3 |
| A21M7 | A21 | M | 7 | 58.8 | 39.5 | 0.5 | 0 | 1.2 | 98.3 | 0.67 | 1.2 | 1.7 |
| A22L1 | A22 | L | 1 | 47.6 | 48 | 0.8 | 3.6 | 0 | 95.6 | 1.01 | 3.6 | 4.4 |
| A22L2 | A22 | L | 2 | 53.2 | 45.7 | 0.9 | 0.2 | 0 | 98.9 | 0.86 | 0.2 | 1.1 |
| A22L3 | A22 | L | 3 | 55.7 | 43.5 | 0.8 | 0 | 0 | 99.2 | 0.78 | 0 | 0.8 |
| A22L4 | A22 | L | 4 | 57.3 | 41.6 | 1.1 | 0 | 0 | 98.9 | 0.73 | 0 | 1.1 |
| A22L5 | A22 | L | 5 | 58.5 | 40.7 | 0.8 | 0 | 0 | 99.2 | 0.70 | 0 | 0.8 |
| A22L6 | A22 | L | 6 | 59.7 | 39.1 | 1 | 0 | 0.2 | 98.8 | 0.65 | 0.2 | 1.2 |
| A22L7 | A22 | L | 7 | 59.9 | 38.3 | 0.9 | 0 | 0.9 | 98.2 | 0.64 | 0.9 | 1.8 |
| A22L8 | A22 | L | 8 | 61.5 | 31.1 | 1.1 | 0 | 6.3 | 92.6 | 0.51 | 6.3 | 7.4 |
| A22N1 | A22 | N | 1 | 47.2 | 47.9 | 1 | 3.9 | 0 | 95.1 | 1.01 | 3.9 | 4.9 |
| A22N2 | A22 | N | 2 | 52.5 | 46.3 | 0.9 | 0.3 | 0 | 98.8 | 0.88 | 0.3 | 1.2 |
| A22N3 | A22 | N | 3 | 55 | 44 | 1 | 0 | 0 | 99 | 0.80 | 0 | 1 |
| A22N4 | A22 | N | 4 | 57 | 42.1 | 0.9 | 0 | 0 | 99.1 | 0.74 | 0 | 0.9 |
| A22N5 | A22 | N | 5 | 58.2 | 40.8 | 1 | 0 | 0 | 99 | 0.70 | 0 | 1 |
| A22N6 | A22 | N | 6 | 59 | 39.6 | 1.2 | 0 | 0.2 | 98.6 | 0.67 | 0.2 | 1.4 |
| A22N7 | A22 | N | 7 | 59.5 | 38.5 | 1 | 0 | 1 | 98 | 0.65 | 1 | 2 |
| A22N8 | A22 | N | 8 | 61 | 31.2 | 1.3 | 0 | 6.5 | 92.2 | 0.51 | 6.5 | 7.8 |

TABLE 3

| Test No. | Tensile strength N/mm² | Proof stress N/mm² | Elongation % | Impact properties J/cm² | Dezincification corrosion Depth (μm) | Erosion and corrosion resistance (μm/1 week) | Tensile strength after test 2 N/mm² | Cutting resistance (N) Main component force |
|---|---|---|---|---|---|---|---|---|
| A11L1 | 424 | 215 | 11 | 16 | 380 | 70 | 407 | 119 |
| A11L2 | 440 | 215 | 21 | 19 | 200 | 40 | 440 | |

TABLE 3-continued

| Test No. | Tensile strength N/mm² | Proof stress N/mm² | Elongation % | Impact J/cm² | Dezincification corrosion properties Depth (μm) | Erosion and corrosion resistance (μm/1 week) | Tensile strength after test 2 N/mm² | Cutting resistance (N) Main component force |
|---|---|---|---|---|---|---|---|---|
| A11L3 | 436 | 207 | 23 | 22 | 140 | 30 | 442 | |
| A11L4 | 440 | 203 | 25 | 22 | 140 | 30 | 440 | |
| A11L5 | 444 | 201 | 26 | 23 | 130 | 25 | 446 | |
| A11L6 | 430 | 200 | 25 | 23 | 120 | 30 | 435 | |
| A11L7 | 435 | 205 | 19 | 20 | 180 | 40 | 437 | |
| A11L8 | 417 | 215 | 13 | 14 | 270 | 60 | 415 | |
| A11N2 | 415 | 182 | 20 | 20 | 190 | 45 | 418 | |
| A11N3 | 412 | 177 | 24 | 22 | 130 | 30 | 420 | |
| A11N5 | 410 | 175 | 25 | 24 | 140 | 30 | 415 | |
| A11N6 | 413 | 178 | 19 | 20 | 170 | 35 | 405 | |
| A11M2 | 450 | 216 | 18 | 20 | 200 | 40 | 445 | |
| A11M3 | 444 | 220 | 22 | 22 | 120 | 25 | 446 | |
| A11M5 | 440 | 216 | 24 | 21 | 130 | 25 | 442 | |
| A11M7 | 440 | 215 | 17 | 18 | 160 | 35 | 438 | |
| A21L1 | 467 | 250 | 13 | 17 | 130 | 25 | | 121 |
| A21L2 | 480 | 242 | 21 | 22 | 35 | 10 | | |
| A21L3 | 477 | 237 | 25 | 24 | 20 | 8 | | |
| A21L4 | 475 | 235 | 27 | 25 | 15 | 7 | | |
| A21L5 | 473 | 234 | 28 | 26 | 15 | 7 | | |
| A21L6 | 470 | 233 | 27 | 26 | 20 | 10 | | |
| A21L7 | 480 | 240 | 18 | 20 | 40 | 15 | | |
| A21L8 | 455 | 262 | 11 | 15 | 85 | 35 | | |
| A21N2 | 455 | 215 | 22 | 23 | 30 | 10 | | 124 |
| A21N3 | 450 | 208 | 26 | 25 | 20 | 7 | | |
| A21N5 | 447 | 202 | 28 | 26 | 15 | 7 | | |
| A21N7 | 452 | 207 | 19 | 20 | 35 | 15 | | |
| A21M2 | 485 | 248 | 21 | 22 | 40 | 15 | | 120 |
| A21M3 | 483 | 243 | 24 | 23 | 20 | 10 | | |
| A21M5 | 478 | 240 | 26 | 25 | 15 | 8 | | |
| A21M7 | 484 | 244 | 17 | 20 | 40 | 15 | | |
| A22L1 | 468 | 245 | 15 | 18 | 140 | 30 | 462 | |
| A22L2 | 476 | 236 | 21 | 21 | 35 | 10 | 480 | |
| A22L3 | 470 | 230 | 24 | 23 | 20 | 10 | 468 | |
| A22L4 | 465 | 228 | 26 | 24 | 20 | 8 | 464 | |
| A22L5 | 467 | 230 | 26 | 25 | 20 | 8 | 468 | |
| A22L6 | 463 | 224 | 25 | 25 | 20 | 10 | 470 | |
| A22L7 | 470 | 236 | 18 | 21 | 35 | 15 | 465 | |
| A22L8 | 449 | 250 | 13 | 16 | 75 | 30 | 445 | |
| A22N1 | 438 | 215 | 13 | 18 | 155 | 30 | 434 | |
| A22N2 | 445 | 205 | 22 | 22 | 40 | 10 | 450 | |
| A22N3 | 440 | 202 | 25 | 24 | 20 | 10 | 444 | |
| A22N4 | 437 | 200 | 25 | 24 | 25 | 10 | 435 | |
| A22N5 | 440 | 195 | 28 | 25 | 25 | 10 | 440 | |
| A22N6 | 437 | 200 | 26 | 25 | 20 | 10 | 442 | |
| A22N7 | 442 | 198 | 19 | 20 | 40 | 15 | 438 | |
| A22N8 | 417 | 214 | 10 | 15 | 75 | 35 | 422 | |

TABLE 4

| Test No. | Alloy No. | Specimen | Cooling rate | Area fraction (%) | | | | | Computation result | | | |
|---|---|---|---|---|---|---|---|---|---|---|---|---|
| | | | | α | κ | γ | β | μ | α + κ | κ/α | β + μ | β + μ + γ |
| A22M1 | A22 | M | 1 | 47.5 | 48.2 | 0.8 | 3.5 | 0 | 95.7 | 1.01 | 3.5 | 4.3 |
| A22M2 | A22 | M | 2 | 52.8 | 46.1 | 1 | 0.1 | 0 | 98.9 | 0.87 | 0.1 | 1.1 |
| A22M3 | A22 | M | 3 | 56 | 43 | 1 | 0 | 0 | 99 | 0.77 | 0 | 1 |
| A22M4 | A22 | M | 4 | 56.5 | 42.5 | 1 | 0 | 0 | 99 | 0.75 | 0 | 1 |
| A22M5 | A22 | M | 5 | 58 | 40.8 | 1.2 | 0 | 0 | 98.8 | 0.70 | 0 | 1.2 |
| A22M6 | A22 | M | 6 | 58.8 | 40.1 | 0.9 | 0 | 0.2 | 98.9 | 0.68 | 0.2 | 1.1 |
| A22M7 | A22 | M | 7 | 59.3 | 38.5 | 1 | 0 | 1.2 | 97.8 | 0.65 | 1.2 | 2.2 |
| A22M8 | A22 | M | 8 | 60.7 | 32.1 | 1.2 | 0 | 6 | 92.8 | 0.53 | 6 | 7.2 |
| A23L1 | A23 | L | 1 | 44.5 | 47.4 | 2.3 | 5.8 | 0 | 91.9 | 1.07 | 5.8 | 8.1 |
| A23L2 | A23 | L | 2 | 50.4 | 46.6 | 2.4 | 0.6 | 0 | 97 | 0.92 | 0.6 | 3 |
| A23L3 | A23 | L | 3 | 52.6 | 45.2 | 2.2 | 0 | 0 | 97.8 | 0.86 | 0 | 2.2 |
| A23L4 | A23 | L | 4 | 54.8 | 42.6 | 2.6 | 0 | 0 | 97.4 | 0.78 | 0 | 2.6 |
| A23L5 | A23 | L | 5 | 55.1 | 42.5 | 2.4 | 0 | 0 | 97.6 | 0.77 | 0 | 2.4 |
| A23L6 | A23 | L | 6 | 56.2 | 41.3 | 2.4 | 0 | 0.1 | 97.5 | 0.73 | 0.1 | 2.5 |
| A23L7 | A23 | L | 7 | 57 | 40 | 2.3 | 0 | 0.7 | 97 | 0.70 | 0.7 | 3 |
| A23L8 | A23 | L | 8 | 58.4 | 32.8 | 2.6 | 0 | 6.2 | 91.2 | 0.56 | 6.2 | 8.8 |

TABLE 4-continued

| Test No. | Alloy No. | Specimen | Cooling rate | Area fraction (%) α | κ | γ | β | μ | Computation result α + κ | κ/α | β + μ | β + μ + γ |
|---|---|---|---|---|---|---|---|---|---|---|---|---|
| A24L1 | A24 | L | 1 | 72.5 | 24 | 0 | 3.5 | 0 | 96.5 | 0.33 | 3.5 | 3.5 |
| A24L2 | A24 | L | 2 | 75 | 25 | 0 | 0 | 0 | 100 | 0.33 | 0 | 0 |
| A24L3 | A24 | L | 3 | 76.5 | 23.2 | 0.3 | 0 | 0 | 99.7 | 0.30 | 0 | 0.3 |
| A24L4 | A24 | L | 4 | 77 | 22.8 | 0.2 | 0 | 0 | 99.8 | 0.30 | 0 | 0.2 |
| A24L5 | A24 | L | 5 | 78.1 | 21.8 | 0.1 | 0 | 0 | 99.9 | 0.28 | 0 | 0.1 |
| A24L6 | A24 | L | 6 | 78.5 | 21.1 | 0.4 | 0 | 0 | 99.6 | 0.27 | 0 | 0.4 |
| A24L7 | A24 | L | 7 | 79.4 | 19.2 | 0.3 | 0 | 1.1 | 98.6 | 0.24 | 1.1 | 1.4 |
| A24L8 | A24 | L | 8 | 77.2 | 13.6 | 0.2 | 0 | 9 | 90.8 | 0.18 | 9 | 9.2 |
| A25L1 | A25 | L | 1 | 37.5 | 52.1 | 3 | 7.4 | 0 | 89.6 | 1.39 | 7.4 | 10.4 |
| A25L2 | A25 | L | 2 | 42.8 | 53.3 | 3 | 1.9 | 0 | 96.1 | 1.25 | 1.9 | 4.9 |
| A25L3 | A25 | L | 3 | 43.6 | 52.8 | 3.5 | 0.1 | 0 | 96.4 | 1.21 | 0.1 | 3.6 |
| A25L4 | A25 | L | 4 | 46 | 50 | 4 | 0 | 0 | 96 | 1.09 | 0 | 4 |
| A25L5 | A25 | L | 5 | 46.5 | 48.7 | 4.8 | 0 | 0 | 95.2 | 1.05 | 0 | 4.8 |
| A25L6 | A25 | L | 6 | 47.5 | 47.5 | 5 | 0 | 0 | 95 | 1.00 | 0 | 5 |
| A25L7 | A25 | L | 7 | 48.5 | 45.1 | 4.2 | 0 | 2.2 | 93.6 | 0.93 | 2.2 | 6.4 |
| A25L8 | A25 | L | 8 | 49.5 | 38.5 | 3.5 | 0 | 8.5 | 88 | 0.78 | 8.5 | 12 |
| A26L1 | A26 | L | 1 | 53 | 41.5 | 1.8 | 3.7 | 0 | 94.5 | 0.78 | 3.7 | 5.5 |
| A26L2 | A26 | L | 2 | 58.3 | 39.5 | 1.8 | 0.4 | 0 | 97.8 | 0.68 | 0.4 | 2.2 |
| A26L3 | A26 | L | 3 | 60.9 | 37.1 | 2 | 0 | 0 | 98 | 0.61 | 0 | 2 |
| A26L4 | A26 | L | 4 | 63.1 | 34.9 | 2 | 0 | 0 | 98 | 0.55 | 0 | 2 |
| A26L5 | A26 | L | 5 | 64 | 33.9 | 2.1 | 0 | 0 | 97.9 | 0.53 | 0 | 2.1 |
| A26L6 | A26 | L | 6 | 65.5 | 32.7 | 1.8 | 0 | 0 | 98.2 | 0.50 | 0 | 1.8 |
| A26L7 | A26 | L | 7 | 66.5 | 30.7 | 2.1 | 0 | 0.7 | 97.2 | 0.46 | 0.7 | 2.8 |
| A26L8 | A26 | L | 8 | 68 | 24.3 | 1.9 | 0 | 5.8 | 92.3 | 0.36 | 5.8 | 7.7 |

TABLE 5

| Test No. | Tensile strength N/mm² | Proof stress N/mm² | Elongation % | Impact J/cm² | Dezincification corrosion properties Depth (μm) | Erosion and corrosion resistance (μm/1 week) | Tensile strength after test 2 N/mm² | Cutting resistance (N) Main component force |
|---|---|---|---|---|---|---|---|---|
| A22M1 | 475 | 250 | 14 | 18 | 135 | 25 | 469 | |
| A22M2 | 480 | 240 | 20 | 20 | 35 | 10 | 482 | |
| A22M3 | 477 | 235 | 24 | 23 | 20 | 8 | 472 | |
| A22M4 | 470 | 235 | 24 | 23 | 15 | 10 | 475 | |
| A22M5 | 472 | 230 | 25 | 24 | 15 | 8 | 468 | |
| A22M6 | 470 | 232 | 26 | 24 | 20 | 10 | 470 | |
| A22M7 | 477 | 230 | 20 | 30 | 30 | 12 | 476 | |
| A22M8 | 453 | 255 | 13 | 16 | 70 | 35 | 448 | |
| A23L1 | | | | | | | | |
| A23L2 | 460 | 235 | 16 | 17 | 55 | 25 | | |
| A23L3 | | | | | | | | |
| A23L4 | | | | | | | | |
| A23L5 | 458 | 233 | 21 | 20 | 35 | 15 | | |
| A23L6 | | | | | | | | |
| A23L7 | 462 | 230 | 17 | 18 | 50 | 20 | | |
| A23L8 | | | | | | | | |
| A24L1 | | | | | | | | |
| A24L2 | 425 | 183 | 30 | 28 | 25 | 10 | | |
| A24L3 | 420 | 175 | 32 | 30 | 20 | 10 | | |
| A24L4 | | | | | | | | |
| A24L5 | 418 | 167 | 32 | 30 | 20 | 10 | | |
| A24L6 | | | | | | | | |
| A24L7 | 411 | 160 | 26 | 25 | 25 | 15 | | |
| A24L8 | | | | | | | | |
| A25L1 | | | | | | | | |
| A25L2 | 445 | 245 | 12 | 15 | 80 | 30 | | |
| A25L3 | 452 | 235 | 17 | 18 | 40 | 15 | | |
| A25L4 | | | | | | | | |
| A25L5 | 445 | 232 | 18 | 17 | 40 | 20 | | |
| A25L6 | | | | | | | | |
| A25L7 | 434 | 250 | 10 | 14 | 65 | 25 | | |
| A25L8 | | | | | | | | |
| A26L1 | 442 | 233 | 10 | 14 | 125 | 25 | | |
| A26L2 | 454 | 230 | 17 | 18 | 25 | 10 | | |
| A26L3 | 445 | 230 | 20 | 19 | 20 | 5 | | |
| A26L4 | 450 | 225 | 21 | 20 | 20 | 5 | | |
| A26L5 | 450 | 227 | 21 | 20 | 15 | 4 | | |
| A26L6 | 453 | 225 | 21 | 20 | 20 | 4 | | |

TABLE 5-continued

| Test No. | Tensile strength N/mm² | Proof stress N/mm² | Elongation % | Impact J/cm² | Dezincification corrosion properties Depth (μm) | Erosion and corrosion resistance (μm/1 week) | Tensile strength after test 2 N/mm² | Cutting resistance (N) Main component force |
|---|---|---|---|---|---|---|---|---|
| A26L7 | 450 | 230 | 16 | 18 | 30 | 10 | | |
| A26L8 | 435 | 242 | 9 | 13 | 60 | 25 | | |

TABLE 6

| Test No. | Alloy No. | Specimen | Cooling rate | Area fraction (%) α | κ | γ | β | μ | Computation result α + κ | κ/α | β + μ | β + μ + γ |
|---|---|---|---|---|---|---|---|---|---|---|---|---|
| A27L1 | A27 | L | 1 | 53.2 | 39.5 | 2.3 | 5 | 0 | 92.7 | 0.74 | 5 | 7.3 |
| A27L2 | A27 | L | 2 | 58.8 | 38 | 2.4 | 0.8 | 0 | 96.8 | 0.65 | 0.8 | 3.2 |
| A27L3 | A27 | L | 3 | 61.5 | 36.1 | 2.4 | 0 | 0 | 97.6 | 0.59 | 0 | 2.4 |
| A27L4 | A27 | L | 4 | 63.4 | 33.9 | 2.7 | 0 | 0 | 97.3 | 0.53 | 0 | 2.7 |
| A27L5 | A27 | L | 5 | 65 | 32.5 | 2.5 | 0 | 0 | 97.5 | 0.50 | 0 | 2.5 |
| A27L6 | A27 | L | 6 | 65.9 | 31.8 | 2.3 | 0 | 0 | 97.7 | 0.48 | 0 | 2.3 |
| A27L7 | A27 | L | 7 | 67 | 29.9 | 2.5 | 0 | 0.6 | 96.9 | 0.45 | 0.6 | 3.1 |
| A27L8 | A27 | L | 8 | 69.5 | 23.2 | 2.3 | 0 | 5 | 92.7 | 0.33 | 5 | 7.3 |
| A28M1 | A28 | M | 1 | 49.8 | 40.7 | 4 | 5.5 | 0 | 90.5 | 0.82 | 5.5 | 9.5 |
| A28M2 | A28 | M | 2 | 55.4 | 39.1 | 4.3 | 1.2 | 0 | 94.5 | 0.71 | 1.2 | 5.5 |
| A28M3 | A28 | M | 3 | 58.1 | 37.1 | 4.5 | 0.3 | 0 | 95.2 | 0.64 | 0.3 | 4.8 |
| A28M4 | A28 | M | 4 | 60.3 | 34.9 | 4.8 | 0 | 0 | 95.2 | 0.58 | 0 | 4.8 |
| A28M5 | A28 | M | 5 | 61.5 | 33.5 | 5 | 0 | 0 | 95 | 0.54 | 0 | 5 |
| A28M6 | A28 | M | 6 | 62.4 | 32.8 | 4.8 | 0 | 0 | 95.2 | 0.53 | 0 | 4.8 |
| A28M7 | A28 | M | 7 | 63.8 | 31.2 | 4.5 | 0 | 0.5 | 95 | 0.49 | 0.5 | 5 |
| A28M8 | A28 | M | 8 | 66 | 25.5 | 4 | 0 | 4.5 | 91.5 | 0.39 | 4.5 | 8.5 |
| A29L2 | A29 | L | 2 | 58.5 | 39 | 2 | 0.5 | 0 | 97.5 | 0.67 | 0.5 | 2.5 |
| A29L3 | A29 | L | 3 | 61 | 36.8 | 2.2 | 0 | 0 | 97.8 | 0.60 | 0 | 2.2 |
| A29L5 | A29 | L | 5 | 64.9 | 32.7 | 2.4 | 0 | 0 | 97.6 | 0.50 | 0 | 2.4 |
| A29L7 | A29 | L | 7 | 67 | 30.2 | 2.1 | 0 | 0.7 | 97.2 | 0.45 | 0.7 | 2.8 |

TABLE 7

| Test No. | Tensile strength N/mm² | Proof stress N/mm² | Elongation % | Impact J/cm² | Dezincification corrosion properties Depth (μm) | Erosion and corrosion resistance (μm/1 week) | Tensile strength after test 2 N/mm² | Cutting resistance (N) Main component force |
|---|---|---|---|---|---|---|---|---|
| A27L1 | 428 | 226 | 10 | 13 | 240 | 35 | | |
| A27L2 | 445 | 225 | 18 | 16 | 110 | 20 | | |
| A27L3 | 440 | 218 | 20 | 18 | 80 | 8 | | |
| A27L4 | 446 | 215 | 21 | 19 | 80 | 5 | | |
| A27L5 | 448 | 213 | 22 | 18 | 70 | 5 | | |
| A27L6 | 438 | 210 | 20 | 19 | 70 | 5 | | |
| A27L7 | 440 | 216 | 16 | 17 | 90 | 10 | | |
| A27L8 | 422 | 229 | 10 | 12 | 120 | 25 | | |
| A28M1 | 408 | 230 | 9 | 11 | 150 | 30 | | |
| A28M2 | 432 | 226 | 14 | 15 | 100 | 15 | | |
| A28M3 | 442 | 220 | 17 | 17 | 50 | 8 | | |
| A28M4 | 450 | 222 | 20 | 19 | 35 | 3 | | |
| A28M5 | 452 | 218 | 19 | 18 | 35 | 3 | | |
| A28M6 | 443 | 214 | 20 | 18 | 45 | 5 | | |
| A28M7 | 435 | 216 | 16 | 16 | 60 | 7 | | |
| A28M8 | 424 | 228 | 8 | 10 | 90 | 15 | | |
| A29L2 | 446 | 230 | 16 | 18 | 25 | 10 | | |
| A29L3 | 444 | 228 | 20 | 20 | 20 | 6 | | |
| A29L5 | 448 | 235 | 20 | 19 | 20 | 5 | | |
| A29L7 | 443 | 233 | 16 | 17 | 25 | 12 | | |

TABLE 8

| Test No. | Alloy No. | Specimen | Cooling rate | Area fraction (%) α | κ | γ | β | μ | Computation result α+κ | κ/α | β+μ | β+μ+γ |
|---|---|---|---|---|---|---|---|---|---|---|---|---|
| A31L1 | A31 | L | 1 | 49.7 | 43.5 | 1.8 | 5 | 0 | 93.2 | 0.88 | 5 | 6.8 |
| A31L2 | A31 | L | 2 | 54.4 | 43 | 2 | 0.6 | 0 | 97.4 | 0.79 | 0.6 | 2.6 |
| A31L3 | A31 | L | 3 | 56.5 | 41.5 | 2 | 0 | 0 | 98 | 0.73 | 0 | 2 |
| A31L4 | A31 | L | 4 | 58.9 | 39 | 2.1 | 0 | 0 | 97.9 | 0.66 | 0 | 2.1 |
| A31L5 | A31 | L | 5 | 59.6 | 38.2 | 2.2 | 0 | 0 | 97.8 | 0.64 | 0 | 2.2 |
| A31L6 | A31 | L | 6 | 60.3 | 37.5 | 2.1 | 0 | 0.1 | 97.8 | 0.62 | 0.1 | 2.2 |
| A31L7 | A31 | L | 7 | 60.9 | 36.2 | 2 | 0 | 0.9 | 97.1 | 0.59 | 0.9 | 2.9 |
| A31L8 | A31 | L | 8 | 62.6 | 29.5 | 2.4 | 0 | 5.5 | 92.1 | 0.47 | 5.5 | 7.9 |
| A32L1 | A32 | L | 1 | 52.3 | 43.8 | 0.4 | 3.5 | 0 | 96.1 | 0.84 | 3.5 | 3.9 |
| A32L2 | A32 | L | 2 | 57.4 | 42.3 | 0.2 | 0.1 | 0 | 99.7 | 0.74 | 0.1 | 0.3 |
| A32L3 | A32 | L | 3 | 60.2 | 39.6 | 0.2 | 0 | 0 | 99.8 | 0.66 | 0 | 0.2 |
| A32L4 | A32 | L | 4 | 62.4 | 37.4 | 0.2 | 0 | 0 | 99.8 | 0.60 | 0 | 0.2 |
| A32L5 | A32 | L | 5 | 63.3 | 36.4 | 0.3 | 0 | 0 | 99.7 | 0.58 | 0 | 0.3 |
| A32L6 | A32 | L | 6 | 64.7 | 35.1 | 0.1 | 0 | 0.1 | 99.8 | 0.54 | 0.1 | 0.2 |
| A32L7 | A32 | L | 7 | 66 | 33.3 | 0.2 | 0 | 0.5 | 99.3 | 0.50 | 0.5 | 0.7 |
| A32L8 | A32 | L | 8 | 67.2 | 26.7 | 0.1 | 0 | 6 | 93.9 | 0.40 | 6 | 6.1 |
| A33L1 | A33 | L | 1 | 53.8 | 42 | 1 | 3.2 | 0 | 95.8 | 0.78 | 3.2 | 4.2 |
| A33L2 | A33 | L | 2 | 59 | 39.8 | 1.2 | 0 | 0 | 98.8 | 0.67 | 0 | 1.2 |
| A33L3 | A33 | L | 3 | 61.5 | 37 | 1.5 | 0 | 0 | 98.5 | 0.60 | 0 | 1.5 |
| A33L4 | A33 | L | 4 | 64.2 | 34.3 | 1.5 | 0 | 0 | 98.5 | 0.53 | 0 | 1.5 |
| A33L5 | A33 | L | 5 | 65 | 33.4 | 1.6 | 0 | 0 | 98.4 | 0.51 | 0 | 1.6 |
| A33L6 | A33 | L | 6 | 66.3 | 32.3 | 1.3 | 0 | 0.1 | 98.6 | 0.49 | 0.1 | 1.4 |
| A33L7 | A33 | L | 7 | 67.2 | 30.3 | 1.5 | 0 | 1 | 97.5 | 0.45 | 1 | 2.5 |
| A33L8 | A33 | L | 8 | 69 | 22.6 | 1.4 | 0 | 7 | 91.6 | 0.33 | 7 | 8.4 |
| A34L1 | A34 | L | 1 | 51 | 44.7 | 0.6 | 3.7 | 0 | 95.7 | 0.88 | 3.7 | 4.3 |
| A34L2 | A34 | L | 2 | 55.2 | 44 | 0.7 | 0.1 | 0 | 99.2 | 0.80 | 0.1 | 0.8 |
| A34L3 | A34 | L | 3 | 58.3 | 41.2 | 0.5 | 0 | 0 | 99.5 | 0.71 | 0 | 0.5 |
| A34L4 | A34 | L | 4 | 60.5 | 39 | 0.5 | 0 | 0 | 99.5 | 0.64 | 0 | 0.5 |
| A34L5 | A34 | L | 5 | 61.5 | 37.9 | 0.6 | 0 | 0 | 99.4 | 0.62 | 0 | 0.6 |
| A34L6 | A34 | L | 6 | 63 | 36.5 | 0.5 | 0 | 0 | 99.5 | 0.58 | 0 | 0.5 |
| A34L7 | A34 | L | 7 | 64.2 | 34.8 | 0.7 | 0 | 0.3 | 99 | 0.54 | 0.3 | 1 |
| A34L8 | A34 | L | 8 | 65.5 | 28.4 | 0.6 | 0 | 5.5 | 93.9 | 0.43 | 5.5 | 6.1 |
| A34N2 | A34 | N | 2 | 54.8 | 44.5 | 0.6 | 0.1 | 0 | 99.3 | 0.81 | 0.1 | 0.7 |
| A34N3 | A34 | N | 3 | 58.2 | 41.1 | 0.7 | 0 | 0 | 99.3 | 0.71 | 0 | 0.7 |
| A34N5 | A34 | N | 5 | 61 | 38.2 | 0.8 | 0 | 0 | 99.2 | 0.63 | 0 | 0.8 |
| A34N7 | A34 | N | 7 | 63.5 | 35.3 | 0.8 | 0 | 0.4 | 98.8 | 0.56 | 0.4 | 1.2 |
| A34M2 | A34 | M | 2 | 55 | 44.1 | 0.8 | 0.1 | 0 | 99.1 | 0.80 | 0.1 | 0.9 |
| A34M3 | A34 | M | 3 | 58.1 | 41.1 | 0.8 | 0 | 0 | 99.2 | 0.71 | 0 | 0.8 |
| A34M5 | A34 | M | 5 | 60.8 | 38.2 | 1 | 0 | 0 | 99 | 0.63 | 0 | 1 |
| A34M7 | A34 | M | 7 | 63.5 | 35.2 | 0.8 | 0 | 0.5 | 98.7 | 0.55 | 0.5 | 1.3 |
| A41N1 | A41 | N | 1 | 48.5 | 47.4 | 0.6 | 3.5 | 0 | 95.9 | 0.98 | 3.5 | 4.1 |
| A41N2 | A41 | N | 2 | 54.5 | 44.6 | 0.7 | 0.2 | 0 | 99.1 | 0.82 | 0.2 | 0.9 |
| A41N3 | A41 | N | 3 | 57 | 42.3 | 0.7 | 0 | 0 | 99.3 | 0.74 | 0 | 0.7 |
| A41N4 | A41 | N | 4 | 58.2 | 40.8 | 1 | 0 | 0 | 99 | 0.70 | 0 | 1 |
| A41N5 | A41 | N | 5 | 59.5 | 39.8 | 0.7 | 0 | 0 | 99.3 | 0.67 | 0 | 0.7 |
| A41N6 | A41 | N | 6 | 61 | 38.1 | 0.8 | 0 | 0.1 | 99.1 | 0.62 | 0.1 | 0.9 |
| A41N7 | A41 | N | 7 | 61.2 | 37.4 | 0.7 | 0 | 0.7 | 98.6 | 0.61 | 0.7 | 1.4 |
| A41N8 | A41 | N | 8 | 62.6 | 30.7 | 0.9 | 0 | 5.8 | 93.3 | 0.49 | 5.8 | 6.7 |
| A42N1 | A42 | N | 1 | 47.9 | 46 | 2.5 | 3.6 | 0 | 93.9 | 0.96 | 3.6 | 6.1 |
| A42N2 | A42 | N | 2 | 53.1 | 43.7 | 3 | 0.2 | 0 | 96.8 | 0.82 | 0.2 | 3.2 |
| A42N3 | A42 | N | 3 | 55.6 | 41.5 | 2.9 | 0 | 0 | 97.1 | 0.75 | 0 | 2.9 |
| A42N4 | A42 | N | 4 | 57.6 | 39.4 | 3 | 0 | 0 | 97 | 0.68 | 0 | 3 |
| A42N5 | A42 | N | 5 | 58.3 | 39 | 2.7 | 0 | 0 | 97.3 | 0.67 | 0 | 2.7 |
| A42N6 | A42 | N | 6 | 59.7 | 37.5 | 2.7 | 0 | 0.1 | 97.2 | 0.63 | 0.1 | 2.8 |
| A42N7 | A42 | N | 7 | 60.3 | 36 | 3 | 0 | 0.7 | 96.3 | 0.60 | 0.7 | 3.7 |
| A42N8 | A42 | N | 8 | 61.3 | 29.5 | 3.2 | 0 | 6 | 90.8 | 0.48 | 6 | 9.2 |

TABLE 9

| Test No. | Tensile strength N/mm² | Proof stress N/mm² | Elongation % | Impact J/cm² | Dezincification corrosion properties Depth (μm) | Erosion and corrosion resistance (μm/1 week) | Tensile strength after test 2 N/mm² | Cutting resistance (N) Main component force |
|---|---|---|---|---|---|---|---|---|
| A31L1 | 451 | 235 | 14 | 18 | 135 | 30 | | 100 |
| A31L2 | 466 | 225 | 19 | 20 | 50 | 15 | | |
| A31L3 | 460 | 226 | 23 | 23 | 30 | 10 | | |
| A31L4 | 455 | 220 | 24 | 22 | 30 | 10 | | |
| A31L5 | 458 | 222 | 24 | 23 | 30 | 10 | | |
| A31L6 | 455 | 225 | 24 | 22 | 30 | 12 | | |
| A31L7 | 460 | 222 | 18 | 20 | 45 | 15 | | |

TABLE 9-continued

| Test No. | Tensile strength N/mm² | Proof stress N/mm² | Elongation % | Impact J/cm² | Dezincification corrosion properties Depth (μm) | Erosion and corrosion resistance (μm/1 week) | Tensile strength after test 2 N/mm² | Cutting resistance (N) Main component force |
|---|---|---|---|---|---|---|---|---|
| A31L8 | 444 | 235 | 14 | 17 | 85 | 25 | | |
| A32L1 | 433 | 222 | 18 | 19 | 120 | 35 | | 103 |
| A32L2 | 440 | 212 | 27 | 25 | 20 | 10 | | |
| A32L3 | 435 | 204 | 30 | 27 | 15 | 10 | | |
| A32L4 | 437 | 207 | 33 | 29 | 15 | 10 | | |
| A32L5 | 435 | 205 | 32 | 28 | 15 | 10 | | |
| A32L6 | 438 | 205 | 32 | 28 | 15 | 10 | | |
| A32L7 | 439 | 210 | 30 | 26 | 20 | 10 | | |
| A32L8 | 426 | 220 | 16 | 18 | 70 | 25 | | |
| A33L1 | 453 | 230 | 16 | 19 | 135 | 20 | | |
| A33L2 | 457 | 225 | 24 | 24 | 30 | 3 | | |
| A33L3 | 450 | 215 | 26 | 25 | 20 | 2 | | |
| A33L4 | 453 | 222 | 24 | 24 | 20 | 2 | | |
| A33L5 | 450 | 220 | 26 | 24 | 20 | 2 | | |
| A33L6 | 447 | 215 | 26 | 25 | 20 | 2 | | |
| A33L7 | 456 | 225 | 19 | 20 | 40 | 5 | | |
| A33L8 | 436 | 233 | 12 | 15 | 80 | 20 | | |
| A34L1 | 466 | 252 | 14 | 17 | 130 | 20 | | 107 |
| A34L2 | 472 | 244 | 20 | 21 | 35 | 5 | 475 | |
| A34L3 | 465 | 238 | 24 | 23 | 25 | 3 | | |
| A34L4 | 470 | 235 | 25 | 24 | 25 | 3 | | |
| A34L5 | 467 | 236 | 25 | 24 | 25 | 2 | 466 | |
| A34L6 | 463 | 233 | 24 | 25 | 25 | 3 | | |
| A34L7 | 472 | 235 | 20 | 22 | 30 | 5 | 473 | |
| A34L8 | 452 | 254 | 13 | 17 | 60 | 15 | | |
| A34N2 | 443 | 215 | 22 | 23 | 35 | 3 | 440 | 105 |
| A34N3 | 435 | 210 | 25 | 24 | 25 | 2 | | |
| A34N5 | 436 | 207 | 25 | 24 | 30 | 3 | 432 | |
| A34N7 | 442 | 205 | 20 | 21 | 35 | 5 | 440 | |
| A34M2 | 475 | 252 | 19 | 20 | 35 | 5 | 482 | 106 |
| A34M3 | 470 | 244 | 24 | 24 | 30 | 3 | | |
| A34M5 | 472 | 242 | 24 | 23 | 25 | 3 | 468 | |
| A34M7 | 478 | 244 | 20 | 21 | 30 | 5 | 475 | |
| A41N1 | 438 | 210 | 16 | 18 | 130 | 30 | | 103 |
| A41N2 | 444 | 205 | 20 | 20 | 30 | 10 | | |
| A41N3 | 435 | 200 | 22 | 21 | 20 | 10 | | |
| A41N4 | 440 | 200 | 24 | 23 | 20 | 8 | | |
| A41N5 | 435 | 203 | 23 | 22 | 20 | 10 | | |
| A41N6 | 438 | 198 | 24 | 23 | 20 | 10 | | |
| A41N7 | 440 | 208 | 19 | 21 | 35 | 15 | | |
| A41N8 | 415 | 215 | 11 | 18 | 70 | 25 | | |
| A42N1 | | | | | | | | |
| A42N2 | 433 | 200 | 20 | 18 | 35 | 20 | | |
| A42N3 | | | | | | | | |
| A42N4 | | | | | | | | |
| A42N5 | 420 | 190 | 22 | 20 | 30 | 15 | | |
| A42N6 | | | | | | | | |
| A42N7 | 425 | 192 | 18 | 18 | 45 | 25 | | |
| A42N8 | | | | | | | | |

TABLE 10

| Test No. | Alloy No. | Specimen | Cooling rate | Area fraction (%) | | | | | Computation result | | | |
|---|---|---|---|---|---|---|---|---|---|---|---|---|
| | | | | α | κ | γ | β | μ | α + κ | κ/α | β + μ | β + μ + γ |
| A43N1 | A43 | N | 1 | 49.2 | 45.4 | 1.6 | 3.8 | 0 | 94.6 | 0.92 | 3.8 | 5.4 |
| A43N2 | A43 | N | 2 | 54.5 | 43.2 | 1.8 | 0.5 | 0 | 97.7 | 0.79 | 0.5 | 2.3 |
| A43N3 | A43 | N | 3 | 56.8 | 41.4 | 1.8 | 0 | 0 | 98.2 | 0.73 | 0 | 1.8 |
| A43N4 | A43 | N | 4 | 59.2 | 39.1 | 1.7 | 0 | 0 | 98.3 | 0.66 | 0 | 1.7 |
| A43N5 | A43 | N | 5 | 59.7 | 38.4 | 1.9 | 0 | 0 | 98.1 | 0.64 | 0 | 1.9 |
| A43N6 | A43 | N | 6 | 61.2 | 37 | 1.8 | 0 | 0 | 98.2 | 0.60 | 0 | 1.8 |
| A43N7 | A43 | N | 7 | 63 | 34.7 | 1.7 | 0 | 0.6 | 97.7 | 0.55 | 0.6 | 2.3 |
| A43N8 | A43 | N | 8 | 64.3 | 29 | 1.5 | 0 | 5.2 | 93.3 | 0.45 | 5.2 | 6.7 |
| A44L1 | A44 | L | 1 | 50.8 | 42.5 | 0.8 | 4.1 | 0 | 93.3 | 0.84 | 4.1 | 4.9 |
| A44L2 | A44 | L | 2 | 55.9 | 40.8 | 0.9 | 0.6 | 0 | 96.7 | 0.73 | 0.6 | 1.5 |
| A44L3 | A44 | L | 3 | 57.8 | 39.5 | 0.8 | 0 | 0 | 97.3 | 0.68 | 0 | 0.8 |
| A44L4 | A44 | L | 4 | 60 | 37.3 | 1.1 | 0 | 0 | 97.3 | 0.62 | 0 | 1.1 |
| A44L5 | A44 | L | 5 | 61 | 36.5 | 0.8 | 0 | 0 | 97.5 | 0.60 | 0 | 0.8 |
| A44L6 | A44 | L | 6 | 63 | 34.5 | 1 | 0 | 0.1 | 97.5 | 0.55 | 0.1 | 1.1 |

TABLE 10-continued

| Test No. | Alloy No. | Specimen | Cooling rate | Area fraction (%) α | κ | γ | β | μ | Computation result α + κ | κ/α | β + μ | β + μ + γ |
|---|---|---|---|---|---|---|---|---|---|---|---|---|
| A44L7 | A44 | L | 7 | 63 | 33.8 | 0.9 | 0 | 0.4 | 96.8 | 0.54 | 0.4 | 1.3 |
| A44L8 | A44 | L | 8 | 64 | 27.8 | 1.1 | 0 | 5.8 | 91.8 | 0.43 | 5.8 | 6.9 |
| A45L1 | A45 | L | 1 | 42.2 | 47.8 | 0.8 | 7.6 | 0 | 90 | 1.13 | 7.6 | 8.4 |
| A45L2 | A45 | L | 2 | 48.3 | 48 | 0.9 | 1.1 | 0 | 96.3 | 0.99 | 1.1 | 2 |
| A45L3 | A45 | L | 3 | 50.2 | 47.3 | 0.8 | 0.1 | 0 | 97.5 | 0.94 | 0.1 | 0.9 |
| A45L4 | A45 | L | 4 | 52 | 45.4 | 1.1 | 0 | 0 | 97.4 | 0.87 | 0 | 1.1 |
| A45L5 | A45 | L | 5 | 54.1 | 43.5 | 0.8 | 0 | 0 | 97.6 | 0.80 | 0 | 0.8 |
| A45L6 | A45 | L | 6 | 54.8 | 42.7 | 1 | 0 | 0 | 97.5 | 0.78 | 0 | 1 |
| A45L7 | A45 | L | 7 | 54.9 | 42.1 | 0.9 | 0 | 0.5 | 97 | 0.77 | 0.5 | 1.4 |
| A45L8 | A45 | L | 8 | 56.1 | 36.2 | 1.1 | 0 | 5 | 92.3 | 0.65 | 5 | 6.1 |
| A45N2 | A45 | N | 2 | 48 | 48.1 | 1 | 1.2 | 0 | 96.1 | 1.00 | 1.2 | 2.2 |
| A45N5 | A45 | N | 5 | 53.5 | 44 | 0.8 | 0 | 0 | 97.5 | 0.82 | 0 | 0.8 |
| A45N7 | A45 | N | 7 | 54.2 | 42.8 | 1 | 0 | 0.4 | 97 | 0.79 | 0.4 | 1.4 |
| A45M2 | A45 | M | 2 | 47.8 | 48.3 | 1.1 | 1.1 | 0 | 96.1 | 1.01 | 1.1 | 2.2 |
| A45M5 | A45 | M | 5 | 53.5 | 43.9 | 1 | 0 | 0 | 97.4 | 0.82 | 0 | 1 |
| A45M7 | A45 | M | 7 | 54.3 | 42.5 | 0.9 | 0 | 0.6 | 96.8 | 0.78 | 0.6 | 1.5 |
| 101N1 | 101 |  | 1 | 18 | 72 | 2 | 8 | 0 | 90 | 4.00 | 8 | 10 |
| 101N2 | 101 | N | 2 | 23.2 | 72.8 | 1.2 | 2.8 | 0 | 96 | 3.14 | 2.8 | 4 |
| 101N3 | 101 | N | 3 | 25.2 | 74.3 | 0.5 | 0 | 0 | 99.5 | 2.95 | 0 | 0.5 |
| 101N4 | 101 | N | 4 | 28.7 | 70.8 | 0.5 | 0 | 0 | 99.5 | 2.47 | 0 | 0.5 |
| 101N5 | 101 | N | 5 | 30.5 | 69 | 0.5 | 0 | 0 | 99.5 | 2.26 | 0 | 0.5 |
| 101N6 | 101 |  | 6 | 31.2 | 67.8 | 1 | 0 | 0 | 99 | 2.17 | 0 | 1 |
| 101N7 | 101 | N | 7 | 30.6 | 66.8 | 0.8 | 0 | 1.8 | 97.4 | 2.18 | 1.8 | 2.6 |
| 101N8 | 101 |  | 8 | 31.7 | 61.2 | 0.7 | 0 | 6.4 | 92.9 | 1.93 | 6.4 | 7.1 |
| 102L1 | 102 |  | 1 | 75.5 | 2 | 4.5 | 18 | 0 | 77.5 | 0.03 | 18 | 22.5 |
| 102L2 | 102 | L | 2 | 78.5 | 2 | 6.5 | 13 | 0 | 80.5 | 0.03 | 13 | 19.5 |
| 102L3 | 102 | L | 3 | 78.7 | 5.1 | 10.2 | 6 | 0 | 83.8 | 0.06 | 6 | 16.2 |
| 102L4 | 102 | L | 4 | 79 | 6.5 | 12 | 2.5 | 0 | 85.5 | 0.08 | 2.5 | 14.5 |
| 102L5 | 102 | L | 5 | 81.5 | 5 | 13.5 | 0 | 0 | 86.5 | 0.06 | 0 | 13.5 |
| 102L6 | 102 |  | 6 | 79 | 8 | 13 | 0 | 0 | 87 | 0.10 | 0 | 13 |
| 102L7 | 102 | L | 7 | 81.5 | 6 | 12 | 0 | 0.5 | 87.5 | 0.07 | 0.5 | 12.5 |
| 102L8 | 102 |  | 8 | 80 | 7.5 | 10.5 | 0 | 2 | 87.5 | 0.09 | 2 | 12.5 |
| 103L1 | 103 | L | 1 | 80 | 16.5 | 0 | 3.5 | 0 | 96.5 | 0.21 | 3.5 | 3.5 |
| 103L2 | 103 | L | 2 | 85.5 | 14 | 0 | 0.5 | 0 | 99.5 | 0.16 | 0.5 | 0.5 |
| 103L3 | 103 | L | 3 | 86.8 | 13.2 | 0 | 0 | 0 | 100 | 0.15 | 0 | 0 |
| 103L4 | 103 | L | 4 | 86.8 | 13 | 0.2 | 0 | 0 | 99.8 | 0.15 | 0 | 0.2 |
| 103L5 | 103 | L | 5 | 87.2 | 12.4 | 0.4 | 0 | 0 | 99.6 | 0.14 | 0 | 0.4 |
| 103L6 | 103 | L | 6 | 88 | 11.5 | 0.3 | 0 | 0.2 | 99.5 | 0.13 | 0.2 | 0.5 |
| 103L7 | 103 | L | 7 | 87.4 | 11 | 0.1 | 0 | 1.5 | 98.4 | 0.13 | 1.5 | 1.6 |
| 103L8 | 103 | L | 8 | 86.2 | 9.2 | 0.1 | 0 | 4.5 | 95.4 | 0.11 | 4.5 | 4.6 |

TABLE 11

| Test No. | Tensile strength N/mm² | Proof stress N/mm² | Elongation % | Impact J/cm² | Dezincification corrosion properties Depth (μm) | Erosion and corrosion resistance (μm/1 week) | Tensile strength after test 2 N/mm² | Cutting resistance (N) Main component force |
|---|---|---|---|---|---|---|---|---|
| A43N1 |  |  |  |  |  |  |  |  |
| A43N2 | 452 | 225 | 17 | 18 | 45 | 7 |  |  |
| A43N3 | 448 | 213 | 21 | 20 | 25 | 3 |  |  |
| A43N4 |  |  |  |  |  |  |  |  |
| A43N5 | 445 | 215 | 23 | 21 | 30 | 3 |  |  |
| A43N6 |  |  |  |  |  |  |  |  |
| A43N7 | 453 | 224 | 16 | 18 | 45 | 10 |  |  |
| A43N8 |  |  |  |  |  |  |  |  |
| A44L1 |  |  |  |  |  |  |  |  |
| A44L2 | 463 | 239 | 15 | 21 | 45 | 25 |  |  |
| A44L3 | 455 | 235 | 20 | 26 | 40 | 20 |  |  |
| A44L4 |  |  |  |  |  |  |  |  |
| A44L5 | 450 | 232 | 22 | 27 | 35 | 15 |  |  |
| A44L6 |  |  |  |  |  |  |  |  |
| A44L7 | 457 | 237 | 17 | 23 | 50 | 20 |  |  |
| A44L8 |  |  |  |  |  |  |  |  |
| A45L1 | 444 | 249 | 8 | 16 | 180 | 35 |  |  |
| A45L2 | 482 | 254 | 17 | 24 | 45 | 20 |  |  |
| A45L3 | 478 | 250 | 21 | 28 | 30 | 15 |  |  |
| A45L4 | 470 | 242 | 22 | 30 | 25 | 10 |  |  |
| A45L5 | 475 | 247 | 22 | 30 | 20 | 10 |  |  |
| A45L6 | 477 | 245 | 20 | 29 | 25 | 10 |  |  |
| A45L7 | 483 | 252 | 16 | 25 | 45 | 15 |  |  |

TABLE 11-continued

| Test No. | Tensile strength N/mm² | Proof stress N/mm² | Elongation % | Impact J/cm² | Dezincification corrosion properties Depth (μm) | Erosion and corrosion resistance (μm/1 week) | Tensile strength after test 2 N/mm² | Cutting resistance (N) Main component force |
|---|---|---|---|---|---|---|---|---|
| A45L8 | 448 | 265 | 9 | 17 | 90 | 35 | | |
| A45N2 | 450 | 225 | 18 | 24 | 40 | 15 | | |
| A45N5 | 441 | 219 | 23 | 28 | 20 | 10 | | |
| A45N7 | 447 | 222 | 16 | 24 | 40 | 15 | | |
| A45M2 | 486 | 260 | 17 | 23 | 40 | 20 | | |
| A45M5 | 480 | 252 | 21 | 30 | 20 | 10 | | |
| A45M7 | 482 | 250 | 16 | 24 | 50 | 15 | | |
| 101N1 | | | | | | | | 146 |
| 101N2 | 438 | 268 | 4 | 13 | 180 | 35 | | |
| 101N3 | | | | | | | | |
| 101N4 | | | | | | | | |
| 101N5 | 430 | 260 | 8 | 17 | 110 | 25 | | |
| 101N6 | | | | | | | | |
| 101N7 | 447 | 270 | 4 | 10 | 140 | 30 | | |
| 101N8 | | | | | | | | |
| 102L1 | | | | | | | | 137 |
| 102L2 | 363 | 142 | 11 | 19 | 650 | 120 | | |
| 102L3 | | | | | | | | |
| 102L4 | | | | | | | | |
| 102L5 | 385 | 139 | 24 | 22 | 350 | 50 | | |
| 102L6 | | | | | | | | |
| 102L7 | 381 | 136 | 23 | 21 | 400 | 75 | | |
| 102L8 | | | | | | | | |
| 103L1 | 389 | 148 | 18 | 21 | 180 | 80 | | |
| 103L2 | 380 | 142 | 24 | 23 | 50 | 35 | 382 | |
| 103L3 | 373 | 138 | 26 | 27 | 35 | 25 | | |
| 103L4 | 375 | 135 | 28 | 30 | 30 | 25 | | |
| 103L5 | 375 | 140 | 27 | 28 | 30 | 25 | 373 | |
| 103L6 | 368 | 132 | 28 | 30 | 35 | 25 | | |
| 103L7 | 377 | 140 | 26 | 27 | 55 | 35 | 375 | |
| 103L8 | 364 | 144 | 15 | 22 | 100 | 70 | | |

TABLE 12

| Test No. | Alloy No. | Specimen | Cooling rate | Area fraction (%) | | | | | Computation result | | | |
|---|---|---|---|---|---|---|---|---|---|---|---|---|
| | | | | α | κ | γ | β | μ | α + κ | κ/α | β + μ | β + μ + γ |
| 104L1 | 104 | L | 1 | 24.5 | 58 | 3.5 | 14 | 0 | 82.5 | 2.37 | 14 | 17.5 |
| 104L2 | 104 | L | 2 | 27.8 | 56 | 6.7 | 9.5 | 0 | 83.8 | 2.01 | 9.5 | 16.2 |
| 104L3 | 104 | L | 3 | 31.2 | 58.3 | 8 | 2.5 | 0 | 89.5 | 1.87 | 2.5 | 10.5 |
| 104L4 | 104 | L | 4 | 35.9 | 56.3 | 7.3 | 0.5 | 0 | 92.2 | 1.57 | 0.5 | 7.8 |
| 104L5 | 104 | L | 5 | 36 | 55 | 9 | 0 | 0 | 91 | 1.53 | 0 | 9 |
| 104L6 | 104 | L | 6 | 37.5 | 54.3 | 8.2 | 0 | 0 | 91.8 | 1.45 | 0 | 8.2 |
| 104L7 | 104 | L | 7 | 38 | 50.8 | 8.5 | 0 | 2.7 | 88.8 | 1.34 | 2.7 | 11.2 |
| 104L8 | 104 | L | 8 | 38.5 | 45.5 | 7 | 0 | 9 | 84 | 1.18 | 9 | 16 |
| 105N5 | 105 | N | 5 | 38 | 49.5 | 12.5 | 0 | 0 | 87.5 | 1.30 | 0 | 12.5 |
| 110N5 | 110 | N | 5 | 96 | 0 | 0 | 0 | 0 | — | — | — | — |
| 111N5 | 111 | N | 5 | 98.1 | 0 | 0 | 0 | 0 | — | — | — | — |
| 112L1 | 112 | L | 1 | 20.9 | 0 | 0 | 77 | 0 | — | — | 77 | 77 |
| 112L2 | 112 | L | 2 | 32.9 | 0 | 0 | 65 | 0 | — | — | 65 | 65 |
| 112L3 | 112 | L | 3 | 47.8 | 0 | 0 | 50 | 0 | — | — | 50 | 50 |
| 112L4 | 112 | L | 4 | 72.4 | 0 | 0 | 25.5 | 0 | — | — | 25.5 | 25.5 |
| 112L5 | 112 | L | 5 | 79.4 | 0 | 0 | 18.4 | 0 | — | — | 18.4 | 18.4 |
| 112L6 | 112 | L | 6 | 84.3 | 0 | 0 | 13.6 | 0 | — | — | 13.6 | 13.6 |
| 112L7 | 112 | L | 7 | 88.4 | 0 | 0 | 9.5 | 0 | — | — | 9.5 | 9.5 |
| 112L8 | 112 | L | 8 | 90.2 | 0 | 0 | 7.7 | 0 | — | — | 7.7 | 7.7 |
| 113M1 | 113 | M | 1 | 0 | 0 | 0 | 98.5 | 0 | — | — | 98.5 | 98.5 |
| 113M2 | 113 | M | 2 | 14.5 | 0 | 0 | 84.0 | 0 | — | — | 84 | 84 |
| 113M3 | 113 | M | 3 | 31.6 | 0 | 0 | 67.0 | 0 | — | — | 67 | 67 |
| 113M4 | 113 | M | 4 | 59 | 0 | 0 | 39.6 | 0 | — | — | 39.6 | 39.6 |
| 113M5 | 113 | M | 5 | 67.5 | 0 | 0 | 31.0 | 0 | — | — | 31 | 31 |
| 113M6 | 113 | M | 6 | 74.5 | 0 | 0 | 24.0 | 0 | — | — | 24 | 24 |
| 113M7 | 113 | M | 7 | 79.5 | 0 | 0 | 19.1 | 0 | — | — | 19.1 | 19.1 |
| 113M8 | 113 | M | 8 | 81 | 0 | 0 | 17.5 | 0 | — | — | 17.5 | 17.5 |
| 114N1 | 114 | N | 1 | 94.3 | 0 | 0 | 4.5 | 0 | — | — | 4.5 | 4.5 |
| 114N2 | 114 | N | 2 | 95.1 | 0 | 0.1 | 3.7 | 0 | — | — | 3.7 | 3.8 |
| 114N3 | 114 | N | 3 | 95.6 | 0 | 0 | 3.2 | 0 | — | — | 3.2 | 3.2 |
| 114N4 | 114 | N | 4 | 97.4 | 0 | 0.1 | 1.4 | 0 | — | — | 1.4 | 1.5 |

TABLE 12-continued

| Test No. | Alloy No. | Specimen | Cooling rate | Area fraction (%) α | κ | γ | β | μ | α + κ | κ/α | β + μ | β + μ + γ |
|---|---|---|---|---|---|---|---|---|---|---|---|---|
| 114N5 | 114 | N | 5 | 97.5 | 0 | 0.2 | 1.1 | 0 | — | — | 1.1 | 1.3 |
| 114N6 | 114 | N | 6 | 97.8 | 0 | 0.2 | 0.9 | 0 | — | — | 0.9 | 1.1 |
| 114N7 | 114 | N | 7 | 97.9 | 0 | 0.3 | 0.6 | 0 | — | — | 0.6 | 0.9 |
| 114N8 | 114 | N | 8 | 98.1 | 0 | 0.4 | 0.4 | 0 | — | — | 0.4 | 0.8 |
| 115L1 | 115 | L | 1 | 64.6 | 0 | 0.1 | 34.1 | 0 | — | — | 34.1 | 34.2 |
| 115L2 | 115 | L | 2 | 74.3 | 0 | 0.2 | 24.3 | 0 | — | — | 24.3 | 24.5 |
| 115L3 | 115 | L | 3 | 80.9 | 0 | 0.3 | 17.5 | 0 | — | — | 17.5 | 17.8 |
| 115L4 | 115 | L | 4 | 89.3 | 0 | 0.3 | 9.2 | 0 | — | — | 9.2 | 9.5 |
| 115L5 | 115 | L | 5 | 91.9 | 0 | 0.5 | 6.3 | 0 | — | — | 6.3 | 6.8 |
| 115L6 | 115 | L | 6 | 94.1 | 0 | 0.5 | 4.2 | 0 | — | — | 4.2 | 4.7 |
| 115L7 | 115 | L | 7 | 95.3 | 0 | 0.7 | 2.7 | 0 | — | — | 2.7 | 3.4 |
| 115L8 | 115 | L | 8 | 96 | 0 | 1 | 1.8 | 0 | — | — | 1.8 | 2.8 |

TABLE 13

| Test No. | Tensile strength N/mm$^2$ | Proof stress N/mm$^2$ | Elongation % | Impact J/cm$^2$ | Dezincification corrosion properties Depth (μm) | Erosion and corrosion resistance (μm/1 week) | Tensile strength after test 2 N/mm$^2$ | Cutting resistance (N) Main component force |
|---|---|---|---|---|---|---|---|---|
| 104L1 | | | | | | | | |
| 104L2 | 458 | 278 | 2 | 11 | 550 | 60 | | |
| 104L3 | 480 | 270 | 5 | 14 | 280 | 40 | | |
| 104L4 | | | | | | | | |
| 104L5 | 472 | 263 | 8 | 17 | 190 | 35 | | |
| 104L6 | | | | | | | | |
| 104L7 | 465 | 272 | 5 | 15 | 260 | 55 | | |
| 104L8 | | | | | | | | |
| 105N5 | 395 | 190 | 4 | 13 | 150 | 45 | 390 | |
| 110N5 | 220 | 82 | 16 | 26 | 10 | 5 | | |
| 111N5 | 195 | 81 | 14 | 23 | 10 | 7 | | 100 |
| 112L1 | 381 | 137 | 18 | 21 | 950 | 130 | | |
| 112L2 | 373 | 130 | 22 | 22 | 900 | 120 | 370 | |
| 112L3 | 371 | 123 | 25 | 24 | 950 | 120 | | |
| 112L4 | 364 | 120 | 26 | 24 | 900 | 130 | | |
| 112L5 | 368 | 122 | 28 | 25 | 850 | 110 | 365 | |
| 112L6 | 366 | 120 | 28 | 25 | 800 | 115 | | |
| 112L7 | 360 | 121 | 29 | 24 | 800 | 120 | 362 | |
| 112L8 | 354 | 116 | 27 | 25 | 850 | 120 | | |
| 113M1 | | | | | | | | 98 |
| 113M2 | 388 | 124 | 16 | 19 | 800 | 120 | | |
| 113M3 | | | | | | | | |
| 113M4 | | | | | | | | |
| 113M5 | 381 | 117 | 24 | 24 | 950 | 130 | | |
| 113M6 | | | | | | | | |
| 113M7 | 278 | 115 | 23 | 25 | 900 | 120 | | |
| 113M8 | | | | | | | | |
| 114N1 | | | | | | | | 104 |
| 114N2 | 335 | 101 | 28 | 23 | 450 | 60 | | |
| 114N3 | | | | | | | | |
| 114N4 | | | | | | | | |
| 114N5 | 328 | 97 | 30 | 26 | 230 | 40 | | |
| 114N6 | | | | | | | | |
| 114N7 | 316 | 88 | 36 | 29 | 110 | 40 | 311 | |
| 114N8 | 308 | 80 | 31 | 27 | 40 | 45 | 298 | |
| 115L1 | | | | | | | | 103 |
| 115L2 | 347 | 110 | 28 | 25 | 670 | 60 | | |
| 115L3 | | | | | | | | |
| 115L4 | | | | | | | | |
| 115L5 | 336 | 103 | 27 | 24 | 380 | 45 | | |
| 115L6 | | | | | | | | |
| 115L7 | 327 | 94 | 34 | 28 | 190 | 20 | 325 | |
| 115L8 | 315 | 87 | 29 | 24 | 70 | 25 | 309 | |

From the results of the tests, the following was found. In the first to four invention alloys, for the respective specimens for which the cooling rate was 0.15° C./second to 50° C./second after being brazed to the specimens L (extruded material), M (hot-forged material), and N (cast material), the area fractions of the respective phases in the metallic structure satisfied relationships of 30≤"α"≤84, 15≤"κ"≤68, "α"+"κ"≥92, 0.2≤"κ"/"α"≤2, 0≤"β"≤3, 0≤"μ"≤5, 0≤"β"+"μ"≤6, 0≤"γ"≤7, and 0≤"β"+"μ"+"γ"≤8. In addition, the respective specimens showed a high pressure resistance of 400 N/mm² or more in terms of tensile strength and 150 N/mm² or more in terms of proof stress. In addition, the respective specimens were favorable in terms of dezincification corrosion properties and erosion and corrosion resistance, and showed excellent corrosion resistance (refer to the respective test results having a cooling rate of 2 to 7 in Alloy Nos. A11, A21 to A26, A31 to A34, and A41 to A45).

Compared to the first invention alloy, the second invention alloy was favorable in terms of erosion and corrosion resistance and corrosion resistance (refer to the respective test results having a cooling rate of 2 to 7 in Alloy Nos. A11 and A21 to A26).

The third invention alloy contained a small amount of Pb and Bi, and had almost the same machinability as a cast metal containing 2.2 mass % Bi (Alloy No. 111) or an extruded rod material containing 1.7 mass % Pb (Alloy No. 115). However, when the composition falls outside of the ranges of the present application, favorable machinability cannot be obtained even when a small amount of Pb is included.

Compared to the first invention alloy, the fourth invention alloy had high tensile strength, proof stress, and strength (refer to the respective test results having a cooling rate of 2 to 7 in Alloy Nos. A11 and A41 to A45).

The influence of the cooling rate will be described. In the invention alloys, at the fastest cooling rate of 70° C./second, the β phase remained, and the tensile strength and the proof stress were high so that the pressure resistance was sufficiently satisfactory, but the elongation and the impact strength were low such that the ductility and the toughness were poor. In addition, the dezincification corrosion properties, the erosion and corrosion resistance were low, and the corrosion resistance was poor. However, when the cooling rate becomes 50° C./second, remaining of the β phase significantly decreases, and elongation, impact strength, dezincification corrosion properties, and erosion and corrosion resistance significantly improve, and there is no problem when the cooling rate becomes 35° C./second (refer to the respective test results in Alloy Nos. A11L1, A11L2, A11L3, and the like).

In the invention alloys, at a slow cooling rate of 0.02° C./second, the area fraction of the μ phase increased. When the area fraction of the μ phase increases, similarly to a case in which the area fraction of the β phase increases, the tensile strength and the proof stress increase, and the pressure resistance becomes satisfactory, but the elongation and the impact value are low, and the ductility and the toughness are poor. In addition, the dezincification corrosion properties and the erosion and corrosion resistance were low, and the corrosion resistance was poor. However, when the cooling rate becomes 0.15° C./second, generation of the μ phase significantly decreases, and the elongation, the impact strength, the dezincification corrosion properties, and the erosion and corrosion resistance significantly improve, whereby there is no problem when the cooling rate becomes 1.0° C./second (refer to the respective test results in Alloy Nos. A11L8, A11L7, A11L6, and the like).

Meanwhile, in the metallic structure, when "α"+"κ"≥94 and 0.3≤"κ"/"α"≤1.5, the balance between tensile strength and proof stress, and elongation, impact value, ductility, and toughness became more favorable, which resulted in dezincification corrosion properties and erosion and corrosion resistance becoming more favorable, and, furthermore, when "α"+"κ"≥95 and 0.5≤"κ"/"α"≤1.2, a more favorable result was obtained. In addition, when relationships of "β"+"μ"≤3, 0≤"γ"≤5, and 0≤"β"+"μ"+"γ"≤5.5 were satisfied, tensile strength, elongation, impact value, ductility, toughness, dezincification corrosion properties, and erosion and corrosion resistance became more favorable, and, when "β"+"μ"≤0.5, 0.05≤"γ"≤3, and 0.05≤"β"+"μ"+"γ"≤3, the characteristics became more favorable. Conversely, when "α"+"κ"<92 within the composition range of the invention alloy, elongation, impact value, ductility, and toughness were poor, proof stress was high, but ductility was low, and therefore tensile strength was low. When "κ"/"α"<0.2, tensile strength and proof stress were low, and, when "κ"/"α">2, elongation, impact value, ductility, and toughness were poor. In addition, proof stress was high, but ductility was low, and therefore tensile strength was low. When "β"+"μ">6, "γ">7, or "β"+"μ"+"γ">8, elongation, impact value, ductility, toughness, dezincification corrosion properties, and erosion and corrosion resistance were poor. In addition, proof stress was high, but ductility was low, and therefore tensile strength was low.

When the K value is between 63.0 and 66.5 even within a range of 62.0 to 67.5, tensile strength, proof stress, elongation, impact strength, dezincification corrosion properties, and erosion and corrosion resistance become more favorable (refer to the respective test results of Alloy Nos. A21, A22, A23, A26, A24, A25, and the like).

When the dezincification corrosion properties of alloys including no Sb, P, and As satisfies the relational formula regarding the phases of the metallic structure, no practical problem occurs; however, in a case in which more favorable dezincification corrosion properties are required, inclusion of Sb, P, and As is required. When 0.3 mass % or more of Sn and 0.45 mass % or more of Al are included, erosion and corrosion resistance becomes more favorable, and, in combination with the inclusion of Sb, P, and As, furthermore, excellent dezincification corrosion properties and erosion and corrosion resistance are obtained. However, since inclusion of Sn and Al precipitates the γ phase to a large extent, the K value or the Cu concentration is preferably set to be within or slightly higher than the range of the application (refer to the respective test results of Alloy Nos. A26, A27, A28, A33, A34, A45, and the like).

When the Si concentration is higher than 4.0 mass %, which is the upper limit value of the range of the invention alloy, ductility and corrosion resistance are poor (refer to the respective test results of Alloy Nos. 101 and the like).

When the Si concentration is lower than 2.5 mass %, which is the lower limit value of the range of the invention alloy, proof stress and tensile strength are low, and corrosion resistance is poor (refer to the respective test result of Alloy No. 102 and the like). It was confirmed that, when Fe is included at 0.26 mass % as an impurity, there is no significant change in the metallic structure after brazing and various characteristics (refer to the respective test results of Alloy Nos. A29 and the like).

When the Cu concentration and the Si concentration are within the ranges of the invention alloy, but the K value is higher than the upper limit value of a range of 62.0 to 67.5, proof stress and tensile strength are low even when the cooling rate is changed (refer to the respective test results of Alloy Nos. 103 and the like).

When the Cu concentration and the Si concentration are within the ranges of the invention alloy, but the K value is lower than the lower limit value of a range of 62.0 to 67.5, ductility, toughness, and corrosion resistance are poor even when the cooling rate is changed (refer to the respective test results of Alloy Nos. 104, 105, and the like).

The tensile strength from the salt bath test of the test 1 and the tensile strength from the brazing test of the test 2 indicated almost the same values. Therefore, it was determined that the invention alloys which indicated favorable results in the salt bath test of the test 1 had high proof stress and tensile strength even when being heated to a brazing temperature of 800° C., and were excellent in terms of ductility, toughness, and corrosion resistance even when a special thermal treatment was not performed after brazing.

Furthermore, the invention is not limited to the configuration of the above embodiments, and various modifications are allowed within the scope of the purports of the invention.

The application claims priority based on Japanese Patent Application No. 2010-238311, and the content thereof is incorporated herein by reference.

INDUSTRIAL APPLICABILITY

As described above, since the pressure resistant and corrosion resistant copper alloy according to the invention has high pressure resistance and excellent corrosion resistance, the pressure resistant and corrosion resistant copper alloy is preferable for brazed vessels, tools, and members, such as a variety of valves including a high-pressure valve, a plug valve, a hood valve, a diaphragm valve, a bellows valve, and a control valve; a variety of joints such as a pipe joint, a T-shape joint, a tee (T-type) pipe, and an elbow pipe; a variety of valves such as a cold and warm water valve, a low-temperature valve, a reduced-pressure valve, a high-temperature valve, and a safety valve; hydraulic containers such as joints and cylinders; nozzles, sprinklers, water faucet clasps, and the like as vessels, tools, and members of high-pressure gas facilities, air-conditioning facilities, cold and hot-water supply facilities, and the like.

The invention claimed is:

1. A method of manufacturing a brazed structure that comprises a copper alloy, an other material brazed to the copper alloy, and a brazing filler metal that brazes the copper alloy and the other material, wherein the method comprises the steps of:
  (a) interposing the brazing filler metal between the copper alloy and the other material;
  (b) heating the brazed portion of the copper alloy, the brazed portion of the other material, and the brazing filler metal to at least 700° C. or higher so as to be brazed; and
  (c) cooling the brazed portion of the copper alloy at an average cooling rate of 0.1° C./second to 60° C./second in a temperature range from a material temperature when brazing ends to 300° C., or from 700° C. to 300° C.,
  wherein the copper alloy has an alloy composition comprising
    73.0 mass % to 79.5 mass % of Cu; and
    2.5 mass % to 4.0 mass % of Si with a remainder comprising Zn and inevitable impurities, wherein the content of Cu [Cu] mass % and the content of Si [Si] mass % have a relationship of 62.0≤[Cu]−3.6×[Si]≤67.5, and a metallic structure at the brazed portion of the copper alloy includes at least a κ phase in an α phase matrix, and an area fraction of the α phase "α"%, an area fraction of a β phase "β"%, an area fraction of a γ phase "γ"%, an area fraction of the κ phase "κ"%, and an area fraction of a μ phase "μ"% satisfy the relationships 30≤"α"≤84, 15≤"κ"≤68, "α"+"κ"≥92, 0.2≤"κ"/"α"≤2, 0≤"β"≤3, 0≤"μ"≤5, 0≤"β"+"μ"≤6, 0≤"γ"≤7, and 0≤"β"+"μ"+"γ"≤8.

2. A method of manufacturing a brazed structure according to claim 1, wherein, in a state in which the brazing filler metal is interposed between the copper alloy and the other material, the brazed portion of the copper alloy, the brazed portion of the other material, and the brazing filler metal are heated to at least 750° C. or higher so as to be brazed, and the brazed portion of the copper alloy is cooled at an average cooling rate of 1.5° C./second to 40° C./second in a temperature range from the material temperature when brazing ends to 300° C., or from 700° C. to 300° C.

3. A method of manufacturing a brazed structure that comprises a copper alloy, an other material brazed to the copper alloy, and a brazing filler metal that brazes the copper alloy and the other material, wherein the method comprises the steps of:
  (a) interposing the brazing filler metal between the copper alloy and the other material;
  (b) heating the brazed portion of the copper alloy, the brazed portion of the other material, and the brazing filler metal to at least 700° C. or higher so as to be brazed; and
  (c) cooling the brazed portion of the copper alloy at an average cooling rate of 0.1° C./second to 60° C./second in a temperature range from a material temperature when brazing ends to 300° C., or from 700° C. to 300° C.,
  wherein the copper alloy has an alloy composition comprising
    73.0 mass % to 79.5 mass % of Cu;
    at least one component selected from the group consisting of 0.015 mass % to 0.2 mass % of P, 0.015 mass % to 0.2 mass % of Sb, 0.015 mass % to 0.15 mass % of As, 0.03 mass % to 1.0 mass % of Sn, and 0.03 mass % to 1.5 mass % of Al; and
    2.5 mass % to 4.0 mass % of Si with a remainder comprising Zn and inevitable impurities,
  wherein the content of Cu [Cu] mass % and the content of Si [Si] mass % have a relationship of 62.0≤[Cu]−3.6×[Si]≤67.5, and wherein the content of Cu [Cu] mass %, the content of Si [Si] mass %, the content of P [P] mass %, the content of Sb [Sb] mass %, the content of As [As] mass %, the content of Sn [Sn] mass %, and the content of Al [Al] mass % satisfy the relationship of 62.0≤[Cu]−3.6×[Si]−3×[P]−0.3×[Sb]+0.5×[As]−1×[Sn]−1.9×[Al]≤67.5, and a metallic structure at the brazed portion of the copper alloy includes at least a κ phase in an α phase matrix, and an area fraction of the α phase "α"%, an area fraction of a β phase "β"%, an area fraction of a γ phase "γ"%, an area fraction of the κ phase "κ"%, and an area fraction of a μ phase "μ"% satisfy the relationships 30≤"α"≤84, 15≤"κ"≤68, "α"+"κ"≥92, 0.2≤"κ"/"α"≤2, 0≤"μ"≤5, 0≤"β"+"μ"≤6, 0≤"γ"≤7, and 0≤"β"+"μ"+"γ"≤8.

4. A method of manufacturing a brazed structure according to claim 3, wherein, in a state in which the brazing filler metal is interposed between the copper alloy and the other material, the brazed portion of the copper alloy, the brazed portion of the other material, and the brazing filler metal are heated to at least 750° C. or higher so as to be brazed, and the brazed portion of the copper alloy is cooled at an average cooling rate of 1.5° C./second to 40° C./second in a temperature range from the material temperature when brazing ends to 300° C., or from 700° C. to 300° C.

5. A method of manufacturing a brazed structure that comprises a copper alloy, an other material brazed to the copper alloy, and a brazing filler metal that brazes the copper alloy and the other material, wherein the method comprises the steps of:

(a) interposing the brazing filler metal between the copper alloy and the other material;
(b) heating the brazed portion of the copper alloy, the brazed portion of the other material, and the brazing filler metal to at least 700° C. or higher so as to be brazed; and
(c) cooling the brazed portion of the copper alloy at an average cooling rate of 0.1° C./second to 60° C./second in a temperature range from a material temperature when brazing ends to 300° C., or from 700° C. to 300° C., wherein the copper alloy has an alloy composition comprising
  73.0 mass % to 79.5 mass % of Cu;
  at least one component selected from the group consisting of 0.003 mass % to 0.25 mass % of Pb and 0.003 mass % to 0.30 mass % of Bi; and
  2.5 mass % to 4.0 mass % of Si with a remainder comprising Zn and inevitable impurities,
wherein the content of Cu [Cu] mass % and the content of Si [Si] mass % have a relationship of $62.0 \le [Cu]-3.6\times[Si] \le 67.5$, and
wherein the content of Cu [Cu] mass %, the content of Si [Si] mass %, the content of P [P] mass %, the content of Sb [Sb] mass %, the content of As [As] mass %, the content of Sn [Sn] mass %, the content of Al [Al] mass %, the content of Pb [Pb] mass %, and the content of Bi [Bi] mass % satisfy the relationship of $$62.0 \le [Cu]-3.6\times[Si]-3\times[P]-0.3\times[Sb]+0.5\times[As]-1\times[Sn]-1.9\times[Al]+0.5\times[Pb]+0.5\times[Bi] \le 67.5,$$

and a metallic structure at the brazed portion of the copper alloy includes at least a κ phase in an α phase matrix, and an area fraction of the α phase "α"%, an area fraction of a β phase "β"%, an area fraction of a γ phase "γ"%, an area fraction of the κ phase "κ"%, and an area fraction of a μ phase "μ"% satisfy the relationships $30 \le "\alpha" \le 84$, $15 \le "\kappa" \le 68$, $"\alpha"+"\kappa" \ge 92$, $0.2 \le "\kappa"/"\alpha" \le 2$, $0 \le "\beta" \le 3$, $0 \le "\mu" \le 5$, $0 \le "\beta"+"\mu" \le 6$, $0 \le "\gamma" \le 7$, and $0 \le "\beta"+"\mu"+"\gamma" \le 8$.

6. A method of manufacturing a brazed structure according to claim 5, wherein, in a state in which the brazing filler metal is interposed between the copper alloy and the other material, the brazed portion of the copper alloy, the brazed portion of the other material, and the brazing filler metal are heated to at least 750° C. or higher so as to be brazed, and the brazed portion of the copper alloy is cooled at an average cooling rate of 1.5° C./second to 40° C./second in a temperature range from the material temperature when brazing ends to 300° C., or from 700° C. to 300° C.

7. A method of manufacturing a brazed structure that comprises a copper alloy, an other material brazed to the copper alloy, and a brazing filler metal that brazes the copper alloy and the other material, wherein the method comprises the steps of:
(a) interposing the brazing filler metal between the copper alloy and the other material;
(b) heating the brazed portion of the copper alloy, the brazed portion of the other material, and the brazing filler metal to at least 700° C. or higher so as to be brazed; and
(c) cooling the brazed portion of the copper alloy at an average cooling rate of 0.1° C./second to 60° C./second in a temperature range from a material temperature when brazing ends to 300° C., or from 700° C. to 300° C., wherein the copper alloy has an alloy composition comprising
  73.0 mass % to 79.5 mass % of Cu;
  at least one component selected from the group consisting of 0.015 mass % to 0.2 mass % of P, 0.015 mass % to 0.2 mass % of Sb, 0.015 mass % to 0.15 mass % of As, 0.03 mass % to 1.0 mass % of Sn, and 0.03 mass % to 1.5 mass % of Al;
  at least one component selected from the group consisting of 0.003 mass % to 0.25 mass % of Pb and 0.003 mass % to 0.30 mass % of Bi; and
  2.5 mass % to 4.0 mass % of Si with a remainder comprising Zn and inevitable impurities,
wherein the content of Cu [Cu] mass % and the content of Si [Si] mass % have a relationship of $62.0 \le S[Cu]-3.6\times[Si] \le 67.5$, and
wherein the content of Cu [Cu] mass %, the content of Si [Si] mass %, the content of P [P] mass %, the content of Sb [Sb] mass %, the content of As [As] mass %, the content of Sn [Sn] mass %, and the content of Al [Al] mass % satisfy the relationship of $$62.0 \le [Cu]-3.6\times[Si]-3\times[P]-0.3\times[Sb]+0.5\times[As]-1\times[Sn]-1.9\times[Al] \le 67.5, \text{ and}$$

wherein the content of Cu [Cu] mass %, the content of Si [Si] mass %, the content of P [P] mass %, the content of Sb [Sb] mass %, the content of As [As] mass %, the content of Sn [Sn] mass %, the content of Al [Al] mass %, the content of Pb [Pb] mass %, and the content of Bi [Bi] mass % satisfy the relationship of $$62.05[Cu]-3.6\times[Si]-3\times[P]-0.3\times[Sb]+0.5\times[As]-1\times[Sn]-1.9\times[Al]+0.5\times[Pb]+0.5\times[Bi] \le 67.5,$$

and a metallic structure at the brazed portion of the copper alloy includes at least a κ phase in an α phase matrix, and an area fraction of the α phase "α"%, an area fraction of a β phase "β"%, an area fraction of a γ phase "γ"%, an area fraction of the κ phase "κ"%, and an area fraction of a μ phase "μ"% satisfy the relationships $30 \le "\alpha" \le 84$, $15 \le "\kappa" \le 68$, $"\alpha"+"\kappa" \ge 92$, $0.2 \le "\kappa"/"\alpha" \le 2$, $0 \le "\beta" \le 3$, $0 \le "\beta"+"\mu" \le 6$, $0 \le "\gamma" \le 7$, and $0 \le "\beta"+"\mu"+"\gamma" \le 8$.

8. A method of manufacturing a brazed structure according to claim 7, wherein, in a state in which the brazing filler metal is interposed between the copper alloy and the other material, the brazed portion of the copper alloy, the brazed portion of the other material, and the brazing filler metal are heated to at least 750° C. or higher so as to be brazed, and the brazed portion of the copper alloy is cooled at an average cooling rate of 1.5° C./second to 40° C./second in a temperature range from the material temperature when brazing ends to 300° C., or from 700° C. to 300° C.

* * * * *